(12) United States Patent
File

(10) Patent No.: US 12,459,639 B2
(45) Date of Patent: Nov. 4, 2025

(54) TWIN FAN, REDUNDANTLY CONFIGURED VERTICAL LIFT VEHICLE

(71) Applicant: David J. File, Carlsbad, CA (US)

(72) Inventor: David J. File, Carlsbad, CA (US)

(*) Notice: Subject to any disclaimer, the term of this patent is extended or adjusted under 35 U.S.C. 154(b) by 0 days.

(21) Appl. No.: 18/751,194

(22) Filed: Jun. 22, 2024

(65) Prior Publication Data

US 2024/0425177 A1  Dec. 26, 2024

Related U.S. Application Data

(60) Provisional application No. 63/522,991, filed on Jun. 23, 2023.

(51) Int. Cl.
| | |
|---|---|
| *B64C 29/00* | (2006.01) |
| *B64C 11/30* | (2006.01) |
| *B64C 11/48* | (2006.01) |
| *B64D 27/357* | (2024.01) |
| *B64D 31/09* | (2024.01) |
| *B64U 10/20* | (2023.01) |
| *B64U 101/60* | (2023.01) |

(52) U.S. Cl.
CPC .......... *B64C 29/0016* (2013.01); *B64C 11/30* (2013.01); *B64C 11/48* (2013.01); *B64D 27/357* (2024.01); *B64D 31/09* (2024.01); *B64U 10/20* (2023.01); *B64U 2101/60* (2023.01); *B64U 2201/10* (2023.01)

(58) Field of Classification Search
CPC ..... B64C 29/0016; B64C 11/48; B64D 31/09; B64U 30/296
See application file for complete search history.

(56) References Cited

U.S. PATENT DOCUMENTS

| | | |
|---|---|---|
| 5,395,073 A | 3/1995 | Rutan et al. |
| 8,864,062 B2 | 10/2014 | Karem |
| 9,417,325 B1 | 8/2016 | Bry et al. |

(Continued)

FOREIGN PATENT DOCUMENTS

| | | |
|---|---|---|
| AU | 2018355071 B2 | 4/2021 |
| CN | 209037854 U | 6/2019 |

(Continued)

OTHER PUBLICATIONS

Chana, W., et al., "Tilt Wing for High Speed VSTOL Aircraft," ICAS-9406.3.2, dated 1992.

(Continued)

*Primary Examiner* — Philip J Bonzell
*Assistant Examiner* — Michael B. Kreiner
(74) *Attorney, Agent, or Firm* — VISTA IP LAW GROUP LLP

(57) ABSTRACT

Improved aircraft, which may be configured as unmanned drones or piloted aircraft, having improved fail-operational performance. The aircraft includes a twin fan arrangement and innovative motor, propeller, driver and/or power source redundancies configured to provide fail-operational functioning in the event of failure of one or more of these aircraft components. In various optional features, the aircraft may be configured for vertical takeoff and landing. The disclosed embodiments provide an aircraft that is safer and more reliable than current multi-propeller drones, while operably more versatile in cargo delivery.

21 Claims, 8 Drawing Sheets

(56) References Cited

U.S. PATENT DOCUMENTS

| | | |
|---|---|---|
| 9,494,937 B2 | 11/2016 | Siegel et al. |
| 9,828,107 B1 | 11/2017 | Ruymgaart et al. |
| 9,868,526 B2 | 1/2018 | Yates |
| 10,000,285 B2 | 6/2018 | Shannon et al. |
| 10,004,652 B1 | 6/2018 | Groden et al. |
| 10,017,237 B2 | 7/2018 | Hutson et al. |
| 10,065,726 B1 * | 9/2018 | Phan ............... B64D 17/80 |
| 10,131,428 B1 | 11/2018 | Sopper |
| 10,139,825 B2 | 11/2018 | Groden et al. |
| 10,229,605 B2 | 3/2019 | High et al. |
| 10,242,580 B2 | 3/2019 | Groden et al. |
| 10,364,030 B2 | 7/2019 | Prager et al. |
| 10,407,162 B2 * | 9/2019 | Datta ............... B64U 30/296 |
| 10,531,994 B2 | 1/2020 | Groden et al. |
| 10,725,139 B1 | 7/2020 | Duksta et al. |
| 10,748,107 B2 | 8/2020 | Stoman |
| 10,748,434 B2 | 8/2020 | Beltman et al. |
| 10,789,567 B1 | 9/2020 | Ur |
| 10,988,257 B2 | 4/2021 | Von Flotow et al. |
| 11,462,116 B2 | 10/2022 | Xu et al. |
| 11,465,738 B2 * | 10/2022 | Karem ............... B64D 31/16 |
| 11,479,341 B2 | 10/2022 | Chan |
| 11,482,118 B1 | 10/2022 | Nealy et al. |
| 11,482,119 B2 | 10/2022 | Xu et al. |
| 11,487,016 B2 | 11/2022 | Sundaramurthy et al. |
| 11,555,911 B2 | 1/2023 | Brandao |
| 11,560,226 B2 | 1/2023 | Miller |
| 11,565,605 B2 | 1/2023 | Nubbe |
| 11,565,805 B2 | 1/2023 | Yates |
| 11,565,813 B2 | 1/2023 | Fulbright |
| 11,565,829 B2 | 1/2023 | Kim |
| 11,567,513 B2 | 1/2023 | Torii et al. |
| 11,568,508 B2 | 1/2023 | High et al. |
| D978,719 S | 2/2023 | Xiao |
| 11,572,166 B2 | 2/2023 | Chen et al. |
| 11,572,169 B2 | 2/2023 | Schmalzried et al. |
| 11,572,259 B2 | 2/2023 | Bash et al. |
| 11,573,564 B2 | 2/2023 | Chen et al. |
| 11,574,352 B2 | 2/2023 | Ferguson et al. |
| 11,577,834 B1 | 2/2023 | Meng et al. |
| 11,579,232 B1 | 2/2023 | Duksta et al. |
| 11,579,606 B2 | 2/2023 | Hwang et al. |
| 11,583,122 B2 | 2/2023 | Rogers et al. |
| 11,584,512 B2 | 2/2023 | Heafitz et al. |
| 11,586,222 B2 | 2/2023 | Georgeson et al. |
| 11,586,228 B2 | 2/2023 | Gandiga |
| 11,587,001 B2 | 2/2023 | Lassoued et al. |
| 11,587,015 B2 | 2/2023 | Longin et al. |
| 11,608,167 B2 * | 3/2023 | Karem ............... B64C 11/46 |
| 11,708,158 B2 | 7/2023 | Mores et al. |
| 2011/0024554 A1 | 2/2011 | Monleau |
| 2012/0221175 A1 | 8/2012 | Spinelli |
| 2014/0081505 A1 | 3/2014 | Klinger et al. |
| 2014/0312177 A1 | 10/2014 | Gaonjur |
| 2015/0254988 A1 | 9/2015 | Wang et al. |
| 2015/0269438 A1 | 9/2015 | Samarasekera et al. |
| 2015/0339933 A1 | 11/2015 | Batla et al. |
| 2016/0180719 A1 | 6/2016 | Wouhaybi et al. |
| 2016/0299231 A1 | 10/2016 | Bianchi et al. |
| 2017/0103658 A1 | 4/2017 | Djordjevic et al. |
| 2017/0129621 A1 | 5/2017 | Flotte et al. |
| 2017/0144741 A1 | 5/2017 | Wang et al. |
| 2017/0186328 A1 | 6/2017 | Beernaert |
| 2017/0263133 A1 | 9/2017 | Blomberg et al. |
| 2017/0278410 A1 | 9/2017 | Byers et al. |
| 2017/0301234 A1 | 10/2017 | Park |
| 2017/0372625 A1 | 12/2017 | Horinouchi |
| 2018/0045522 A1 | 2/2018 | Aziz |
| 2018/0047294 A1 | 2/2018 | Esposito |
| 2018/0188747 A1 | 7/2018 | Venturelli |
| 2018/0272993 A1 | 9/2018 | Johnson |
| 2018/0278321 A1 | 9/2018 | Liebe et al. |
| 2018/0352452 A1 | 12/2018 | Parthasarathy |
| 2018/0365265 A1 | 12/2018 | Blanc et al. |
| 2019/0009894 A1 | 1/2019 | Cai |
| 2019/0042748 A1 | 2/2019 | Shabtai et al. |
| 2019/0114930 A1 | 4/2019 | Russell |
| 2019/0162841 A1 | 5/2019 | Peckham |
| 2019/0266897 A1 | 8/2019 | Turato |
| 2019/0281483 A1 | 9/2019 | Chalmer et al. |
| 2019/0300172 A1 | 10/2019 | Di Benedetto et al. |
| 2019/0392716 A1 | 12/2019 | Lu et al. |
| 2020/0005651 A1 | 1/2020 | Priest |
| 2020/0013294 A1 | 1/2020 | Nanukuttan et al. |
| 2020/0172257 A1 | 6/2020 | Bhat |
| 2020/0283127 A1 * | 9/2020 | Cheng ............... B64D 9/00 |
| 2020/0349852 A1 | 11/2020 | Dicosola |
| 2020/0369384 A1 | 11/2020 | Kelly |
| 2020/0372806 A1 | 11/2020 | Wang et al. |
| 2020/0372811 A1 | 11/2020 | Lindqvist et al. |
| 2020/0389193 A1 | 12/2020 | Brandao |
| 2021/0005092 A1 | 1/2021 | Chen et al. |
| 2021/0013595 A1 | 1/2021 | Ramsey et al. |
| 2021/0056857 A1 | 2/2021 | Campbell et al. |
| 2021/0134162 A1 | 5/2021 | Sundaramurthy et al. |
| 2021/0144671 A1 | 5/2021 | Matsuki |
| 2021/0159971 A1 | 5/2021 | Panchal et al. |
| 2021/0197965 A1 | 7/2021 | Kunz et al. |
| 2021/0224739 A1 | 7/2021 | Sweeny et al. |
| 2021/0312820 A1 | 10/2021 | Yamada et al. |
| 2021/0339887 A1 | 11/2021 | Walsh et al. |
| 2022/0036741 A1 | 2/2022 | Ozturk et al. |
| 2022/0051570 A1 | 2/2022 | Zhang et al. |
| 2022/0058960 A1 | 2/2022 | Stein |
| 2022/0092989 A1 | 3/2022 | Li et al. |
| 2022/0101735 A1 | 3/2022 | Malboubi et al. |
| 2022/0198940 A1 | 6/2022 | Mcmillan |
| 2022/0215761 A1 | 7/2022 | Bowyer et al. |
| 2022/0223051 A1 | 7/2022 | Bruillot et al. |
| 2022/0274711 A1 | 9/2022 | Level et al. |
| 2022/0284820 A1 | 9/2022 | Yang et al. |
| 2022/0292988 A1 | 9/2022 | Ocheltree |
| 2022/0340292 A1 | 10/2022 | Churchill et al. |
| 2022/0414568 A1 | 12/2022 | Surace |
| 2022/0415184 A1 | 12/2022 | Summer et al. |
| 2023/0002042 A1 | 1/2023 | Karem et al. |
| 2023/0015158 A1 | 1/2023 | Evans |
| 2023/0015540 A1 | 1/2023 | Wang et al. |
| 2023/0031028 A1 | 2/2023 | Ehasoo et al. |
| 2023/0032246 A1 | 2/2023 | Kaneria et al. |
| 2023/0035682 A1 | 2/2023 | Seo |
| 2023/0043334 A1 | 2/2023 | Tanaka et al. |
| 2023/0044060 A1 | 2/2023 | Carr |

FOREIGN PATENT DOCUMENTS

| | | |
|---|---|---|
| JP | 2022-126563 | 8/2022 |
| WO | WO 2017/081668 A1 | 5/2017 |

OTHER PUBLICATIONS

"The Aerodynamics of V/STOL Aircraft", AGARD, AD688921, North Atlantic Treaty Organization, dated May 1968.

Cutler, Mark and How, Jonathan P. "Analysis and Control of a Variable-Pitch Quadrotor for Agile Flight." Journal of Dynamic Systems, Measurement, and Control 137, No. 10, dated Jul. 2015.

Bohorquez, F.; Samuel, P.; Sirohi, J.; Pines, D.; Rudd, L.; Perel, R., MAV Design & Analysis, and hover performance of a rotary wing micro air vehicle. J. Am. Helicopter Soc, 48, 80-90, dated Jan. 2003.

McDonald, R., "Modeling of Electric Motor Driven Propellers for Conceptual Aircraft Design", American Institute of Aeronautics and Astronautics, dated Jan. 2016.

Chen, Z., et al., "Design of Flight Control System for a Novel Tilt-Rotor UAV," Hindawi Complexity, vol. 2020, Article ID 4757381, 14 pages, dated Mar. 13, 2020.

Miljković, D., "Methods for Attenuation of Unmanned Aerial Vehicle Noise," Conference Paper, 2018.

Hepperle, M., "Helicopters and Compound Aircraft", URL: https://mh-aerotools.de), date captured May 18, 2021.

Hepperle, M., "Static Thrust of Propellers," Propulsion by Propellers (https://mh-aerotools.de), date found via Google as Jan. 31, 2001.

(56) References Cited

OTHER PUBLICATIONS

Kelly, J., et al., "Flight investigation of manual and automatic VTOL decelerating instrument approaches and landings," TN D-7524, NASA, dated Jul. 1974.
Scholz, D., "An Optiomal APU for Passenger Aircraft," 5th CEAS Air and Space Conference 2015, Delft, 07.-11. Sep. 2015.
McKerrow, Phillip J., "Modelling the Draganflyer four-rotor helicopter", ICRA, dated Apr. 2004.
Stoll, A., "Analysis and Full Scale Testing of the Joby S4 Propulsion System," JOBY Aviation, dated Aug. 3, 2015.
Vimalkumar. R, "Design Methodology for Quadcopter with Co-Axial Propulsion units to Achieve Thrust and Stability Demand During Flight," International Journal of Engineering Research & Technology (IJERT), http://www.ijert.org ISSN: 2278-0181, vol. 9 Issue 06, Jun. 2020.
PCT International Search Report and Written Opinion for International Appln. No. PCT/US2024/035151, applicant File David J., dated May 12, 2025.

\* cited by examiner

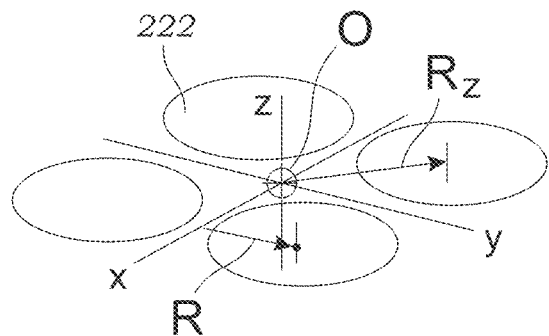
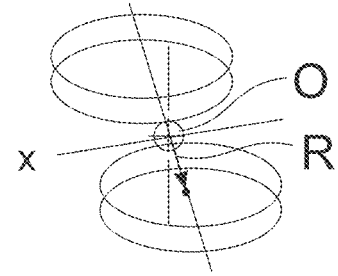
$I_{xx} = 4m_e R^2$ (roll)
$I_{yy} = 4m_e R^2$ (pitch)
$I_{zz} = 4m_e 2R^2$ (yaw)
Pitch: $4m_e R^2$ (Quad)
$I_{xx} = 4m_e R^2$ (roll)
$I_{yy} = 4I_e$ (pitch)
$I_{zz} = 4m_e R^2$ (yaw)
Pitch: $4I_e$ (Twin Fan)
*FIG. 7A*  *FIG. 7B*
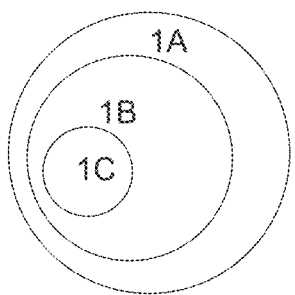
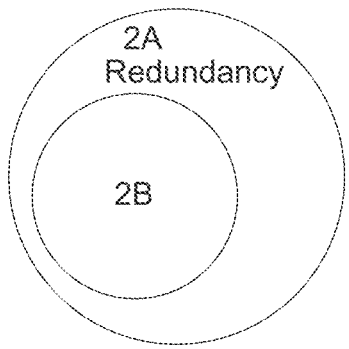
*FIG. 8A*  *FIG. 8B*
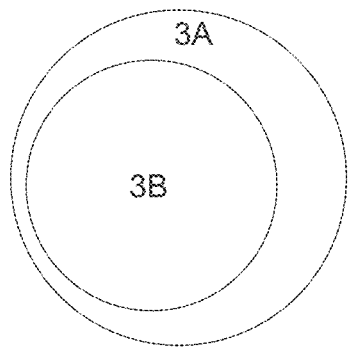
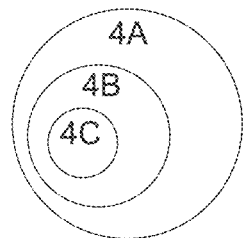
*FIG. 8C*  *FIG. 8D*

TWIN FAN, REDUNDANTLY CONFIGURED VERTICAL LIFT VEHICLE

CROSS-REFERENCE TO RELATED APPLICATIONS

This application claims the benefit of priority of U.S. Provisional Patent Application Ser. No. 63/522,991, entitled "TWIN FAN, REDUNDANTLY CONFIGURED VERTICAL LIFT VEHICLE," and filed on Jun. 23, 2023. The contents of the foregoing application is hereby expressly incorporated by reference for all purposes.

FIELD

The present subject matter relates to aircraft, including drones, and more specifically, to aircraft and drones having vertical take-off and landing (VTOL) capability and having redundant components configured for fail-operational functioning.

BACKGROUND

Quadcopters are flying platforms typically comprising a fuselage and four supports each carrying a motor with a propeller, and disposed at a corner of a rectangular envelope, for a total of four motors and respective propellers. Quadcopters are unmanned aerial vehicles commonly referred to as drones. Drones may be remotely flown by human operators (i.e., remotely piloted by a human), or autonomous drones which can carry out a flight mission with minimal to no human intervention (i.e., without a human pilot). In recent years drone delivery services have become increasingly widespread, and it is expected that autonomous robotic systems will vastly increase in utility, possibly replacing 50% of human operators within the next decade. It is expected that flying drones will comprise a large percentage of those autonomous robotic systems. However, because of their inherent four-propeller arrangement, quadcopters and similar, are limited in their reliability and safety.

In order to reach the highest levels of safety, necessary for densely populated drone use, it is important to provide for fail-operational functioning. The commonly recognized term "fail-safe" refers to a system that incorporates design functionality which mitigates immediate injury and/or loss of life resulting from system or subcomponent failure, while accepting the loss of the system in a near term scenario. However, the next-higher level of reliability enables "fail-operational" functioning in robotic systems, including aircraft, which provides for a safe landing and maximizing preservation of the system in the event of any subsystem failure. Lastly, the term "fail-mission" refers to the ability of any given system to continue and complete its mission following a subsystem failure, albeit with reduced system redundancies and in some cases with changes in mission objectives, planning and expected outcomes.

The prior art has taken some steps to address the issues of fail-safe, fail-operational and fail-mission functionality in aircraft design. In one example, U.S. Patent Application Pub. No. Number 2022/0274711 discloses a multi-rotor VTOL (vertical take-off and landing) aircraft having at least four pairs of rotors utilizing two motors per rotor. Each rotor can be supplied by two electric generators. Also, each pair of rotors can be supplied by two electric generators. In the event of breakdown of a first electric motor of a rotor or of an electric generator, the second motor of each rotor is configured to operate in an active mode. This arrangement requires a large number of motors—at least eight motors. Overall reliability of the aircraft is reduced with this increased number of motors. It also maintains the groups of fans at corners of a square envelope. These widely spaced motors create non-recoverable trip upset in the event of motor or propeller failure. Also, the physical phenomenon of inertial coupling is produced through symmetry about the z axis, making the motion of the aircraft more difficult to control.

Redundancy is treated differently in U.S. Pat. No. 9,828,107. Four sets of dual-motor, dual-fan pairs are provided. Each set is called a redundant thrust unit (RTU). One RTU is provided at each corner of a framework. Processors monitor the status of each fan-motor pair. For a quad-rotor design, with 8 total engines, the craft is capable of controlled flight on as little as two motors as long as they oppose each other (on opposite sides of the frame). Loss of any single motor has minimal effect on flight as the other motor in the RTU can be powered up to compensate. Loss of two motors, three motors and four motors also have minimal impact on flight as long as each failure is on a different RTU. Loss of a single motor is responded to by powering up the other motor in the same RTU. With the loss of an entire RTU, the craft can continue to fly. The opposing RTU is powered down completely or provides slight up/down thrust. Compensation is provided within a single RTU. Artificial intelligence control units (AICU) monitor the operation of each component. This construction entails additional expense in sophisticated components, expense in programming and in software verification and validation, and affects interchangeability of RTUs. The AICU must be trained to compensate flight control input and limits for one or more motor failures. This arrangement involves a very complicated compensation scheme requiring the use of constant monitoring and the use of artificial intelligence.

U.S. Patent Application Pub. No. 2021/0197965 discloses the use of a fixed boom for supporting rotor assemblies in vertical lift motor modules. Parallel booms are mounted on opposite wings of an airplane to position the rotor assemblies in a quadcopter configuration. Balanced rotor assemblies are provided on opposite sides of a fuselage and on opposite sides of each wing. The quadcopter comprises a pair of gyrocopter modules. Although this application discloses rotor assemblies each supported by a rotor boom, it does not disclose any arrangement of the rotor booms to compensate for motor failure.

U.S. Patent Application Pub. No. 2019/0009894 discloses an example of a twin-propeller, twin-motor propulsion unit. However, a first propeller is driven by a first shaft and a second propeller is driven by a concentric shaft which is over the first shaft. While a twin configuration is shown, it is not relevant to redundancy.

A two-motor propulsion unit having a first and a second electric motor connected to a propeller is seen in U.S. Patent Application Pub. No. 2022/0340292. If a first electric motor fails, the second electric motor will be energized to power the second propeller. No provision is made for relating the performance of a motor in the propulsion unit to any other component outside of the propulsion unit. This system is of limited application because it does not relate system performance to flight conditions or motor power sizing.

U.S. Patent Application Pub. No. 2011/0024554 discloses a system including first and second rotors mounted on opposite sides of a power source. While this application discloses a dual rotor embodiment, it is directed to maintaining the rotors in parallel planes and not to compensating for failures, required maneuvers, or variations in center of gravity ("C.G.").

A coaxial rotor/wing aircraft as shown in U.S. Patent Application Pub. No. 2014/0312177 uses substantially parallel, coaxial rotors about opposite sides of a fuselage. The parallel rotors provide lift. However, this reference does not disclose any means for compensating for failure of a motor or generator.

Thus, there remains a need for an improved aircraft which provides for fail-operational functionality and relatively simple flight compensation scheme while minimizing component redundancy and its related weight penalty.

SUMMARY OF THE DISCLOSURE

Briefly stated, in accordance with the present subject matter, an aircraft is disclosed herein which comprises a four-motor propulsion system, utilizing two, swept booms. Redundant construction is provided to ensure fail-operational functioning of the aircraft. A vital trade is made to increase safety and reliability while minimizing any increase in operating weight empty (OWE). In one optional aspect, the aircraft may be configured for VTOL. In addition, the aircraft may optionally be configured as drones or piloted aircraft.

Fail-operational functionality is critically important to accommodate the prospected increase and useful utility of electrically-powered multi-prop, vertical lift aircraft. As used herein, the term "aircraft" means a vehicle capable of flight by creating lift which overcomes the force of gravity, including unmanned drones, whether human operated or autonomous, unless explicitly limited to a particular type of aircraft. As used herein, the term "drone" means an unmanned aircraft. As used herein, the term "autonomous" means configured to operate without human intervention. Increased reliability in key components such as motors and generators can provide for increased fail-safe operation, however dual redundancy in key subsystems such as power and communication, are typically required for fail-operational safety.

Because the additional weight of redundant components increases fuel consumption (thereby decreasing the time the aircraft can remain aloft), the added redundancy must justify its weight penalty, while also mitigating operational consequences at the system level.

For varied optional, design configurations, the system penalties of redundancy must be effectively integrated to minimize aircraft empty weight for a given level of payload-range performance.

Accordingly, a first embodiment disclosed herein is directed to a twin fan, swept-boom aircraft which provides for fail-operational functioning in the event of component failure. In one optional aspect, the aircraft may be configured for VTOL. The aircraft comprises a fuselage (i.e., main body of the aircraft) having a longitudinal axis extending from the rear to the front of the fuselage. A first propulsion unit and a second propulsion unit are disposed on opposite sides of the fuselage. In one aspect, the first propulsion unit may be mounted to the fuselage by a first boom pivotally coupled to the fuselage and extending outward of the fuselage such that a sweep angle of the first boom relative to the longitudinal axis is adjustable; and the second propulsion unit is similarly mount to the fuselage by a second boom pivotally coupled to the fuselage and extending outward of the fuselage on the opposite side of the fuselage such that a sweep angle of the first boom relative to the longitudinal axis is adjustable.

In one optional aspect, each of the first propulsion unit and second propulsion unit may be rotatably mounted to the respective first boom and second boom such that a pitch of the first propulsion unit and second propulsion unit are adjustable.

Each of the first propulsion unit and second propulsion unit comprise two motor-propeller assemblies, an upper motor-propeller assembly and a lower motor-propeller assembly. Each motor-propeller assembly may also be called a "fan," and thus the aircraft is appropriately call a "twin fan" redundantly configured aircraft because the aircraft effectively operates with two propulsion units, i.e., one fan on each side of the aircraft, and each of the "fan" on each side of aircraft is redundantly configured with two motor-propeller assemblies or "fans." The motor-propeller assemblies are arranged unconventionally as compared with typical quadcopter design. In a conventional quadcopter, the first through fourth motor-propellers are each positioned at a corner of a predominately square envelope. The first two motor-propellers are spaced apart (i.e., propellers are non-overlapping) at a proximal end and a distal end of a line segment extending in a longitudinal direction of travel. As used herein, the term "non-overlapping" and "non-overlap" with respect to the relative location of two propellers means that a projection of the first propeller along the axis of rotation of the first propeller does not intersect with the second propeller. The second two motor-propellers are spaced apart (i.e., the propellers are non-overlapping) at a proximal end and a distal end of a parallel line segment on an opposite side of a fuselage.

In one innovative aspect of one embodiment disclosed herein, each propulsion unit comprises two propellers, an upper propeller and a lower propeller, which are vertically displaced from each other and overlapping. As used herein, the term "overlapping" and "overlap" with respect to the relative location of two propellers means that a projection of the first propeller along the axis of rotation of the first propeller intersects with the second propeller. Each propulsion unit also comprises an upper motor coupled to and driving the upper propeller and a lower motor coupled to and driving the lower propeller. The upper motor and the lower motor may be substantially co-located (e.g., coaxial or slightly axially offset) with one vertically displaced from the other. For example, the two motors may be positioned vertically back to back.

In another aspect, the upper propeller and low propeller of each propulsion unit counter-rotate (i.e., rotate in opposite direction) in substantially parallel planes. The counter-rotation "zeros-out" angular momentum and gyroscopic loads. In still another aspect, the upper motor-propeller subassembly is positioned forward of the lower, thereby providing propulsive torque control, referred to herein as Epsilon Control, and also providing "clear air" to the forward edge of the upper propeller blades.

Accordingly, each propulsion unit includes redundant propellers and motors thereby enabling fail-operational safety functioning of the aircraft. For instance, if a motor or propeller in the first propulsion unit fails, a corresponding motor-propeller assembly in the second propulsion unit is disabled. Then, the remaining operational motor-propeller assemblies, one in the first propulsion unit and one in the second propulsion unit, are powered at an increased level as required by flight conditions to accommodate for the failed and disabled motor-propeller assemblies. In still another aspect, a corresponding adjustment in boom sweep of the first boom and second boom may be performed to provide trimmed and stable flight of the aircraft. As another example of a fail-operational safety functionality, one motor-propeller assembly on each side of the aircraft can fail (i.e., one motor-propeller assembly in the first propulsion unit and one motor-propeller assembly in the second propulsion unit). In this case, the two remaining operational motor-propeller assemblies, one in the first propulsion unit and one in the second propulsion unit, are powered at an increased level as required by flight conditions to accommodate for the failed and disabled motor-propeller assemblies.

In another aspect, the aircraft may also include redundant drivers for powering the motors of the motor-propeller assemblies to further facilitate fail-operational safety functioning of the aircraft. A first driver is coupled to one of the two motors on each of the first propulsion unit and the second propulsion unit, and a second driver is coupled to the other of the two motors on each of the first propulsion unit and the second propulsion unit. For example, the first driver may be coupled to the upper motor on the first propulsion unit and the upper motor on the second propulsion unit, and the second driver may be coupled to the lower motor on the first propulsion unit and the lower motor on the second propulsion unit. Alternatively, the respective drivers may be coupled to a respective upper motor on one of the propulsion units and a respective lower motor on the other of the propulsion units. The first driver and second driver are independent from each other such that the first driver is capable of driving its respective coupled motors independently of the second driver driving its respective coupled motors and the second driver is capable of driving its respective coupled motors independently of the first driver driving its respective coupled motors.

In another aspect, the use of the two drivers each coupled to respective motor-propeller assemblies on each of the first propulsion unit and second propulsion unit also provides redundancy in the event one of the drivers fails. For instance, in the event that one driver fails thereby disabling the two motor-propeller assemblies coupled to such driver, the remaining operational driver continues to power the motor-propeller assemblies coupled thereto, one in the first propulsion unit and one in the second propulsion unit, at an increased level as required by flight conditions to accommodate for the disabled motor-propeller assemblies. Again, in another aspect, a corresponding adjustment in boom sweep of the first boom and second boom may be performed to provide trimmed and stable flight of the aircraft.

In yet another aspect, the drivers may be utilized to implement the fail-operational safety functionality in the event that a motor or propeller fails in one of the propulsion units, same or similar to that described above. If a motor or propeller fails in one of the propulsion units, the corresponding motor-propeller assembly in the other propulsion unit coupled to the same driver as the failed motor-propeller assembly can be deliberately disabled. This may be accomplished by disabling the driver coupled to the failed motor-propeller assembly or other control or switch. Then, the other driver continues to power the remaining operational motor-propeller assemblies, one in the first propulsion unit and one in the second propulsion unit, at an increased level as required by flight conditions to accommodate for the failed and disabled motor-propeller assemblies. Again, in yet another aspect, a corresponding adjustment in boom sweep of the first boom and second boom may be performed to provide trimmed and stable flight of the aircraft. In the case that one motor-propeller assembly on each side of the aircraft fails (i.e., one motor-propeller assembly in the first propulsion unit and one motor-propeller assembly in the second propulsion unit), both drivers remain active and each driver powers the respective remaining operational motor-propeller assemblies, one in the first propulsion unit and one in the second propulsion unit, at an increased level as required by flight conditions to accommodate for the failed and disabled motor-propeller assemblies.

In still another aspect, the aircraft may also include redundant power systems for powering the motors and other aircraft components and systems, thereby enabling fail-operational safety functionality of the aircraft in the event of failure of one of the power systems. A first generator motor is coupled to and powers a first generator and a second generator motor is coupled to and powers a second generator. The first generator provides power to the first driver and to a first battery. The second generator provides power to the second driver and to a second battery. In another aspect, the power systems may be a hybrid fuel-electric power system in which the generator motors are fuel powered motors (e.g., combustion engines) and the generators generate electric power to power the electric fan motors and/or charge one or more batteries. In the event of failure of the first generator or the second generator, the failed generator is disabled and/or disconnected from the power circuit, and the first battery and second battery are connected to the driver connected to the failed generator to thereby power such driver which in turn powers the respective motors connected to such driver.

In still another aspect of this disclosed embodiment, the aircraft further comprises a controller operably coupled to the first driver and the second driver. The controller is configured to independently control the first driver and second driver in order to independently control the operation of each of the motor-propeller assemblies. In another aspect, the controller is further configured to provide fail-operational functionality of the aircraft in the event of failure of one of the motors, propellers, or drivers, as described herein. In another aspect, the controller may also be programmed with sufficient (and optionally minimal) mode-state awareness to permit numerous fail-safe modes to cope with extreme hazards and situations.

In yet another innovative aspect of the disclosed aircraft embodiment, the upper propeller and lower propeller of each propulsion unit are offset in the direction of flight (i.e., parallel to the longitudinal axis of the fuselage) and the flight controls are configured to utilize the offset of the lift forces of the upper propeller and lower propeller to control the pitch of the aircraft. The distance of the offset in the direction parallel to the longitudinal axis is referred to as the "Epsilon distance." By offsetting the lift forces of the upper propeller and lower propeller of each of the propulsion units, it can be seen that providing differentially thrust from the upper propeller and lower propeller creates a torque (referred to herein as "Epsilon Torque") tending to adjust the pitch of the aircraft (the operational aspects achieved using Epsilon Torque" is referred to herein as "Epsilon Control"). In one aspect, this Epsilon Control may be used as a "fine" pitch control for making relatively small and precise pitch adjustments to the aircraft. In still another aspect, the Epsilon distance of each of the first propulsion unit and second propulsion unit is greater than zero and less than 10% of the greater of (a) a diameter of the respective upper propeller, and (b) a diameter of the respective lower propeller. In still another aspect, the Epsilon distance is between 3% and 10% of the greater of (a) a diameter of the respective upper propeller, and (b) a diameter of the respective lower propeller.

In another aspect, the aircraft may be configured to adjust the first boom and second boom to accommodate for varied payloads carried by the aircraft. For instance, each type of payload may require unique grappling hardware. The aircraft may be configured to automatically detect the combined C.G. position, and load this information into the controller which can in turn automatically adjust the position of the sweep of the first and second booms.

In yet another aspect, the aircraft may be configured to allow custom power-source loading (e.g., batteries) to match payload and range requirements, allowing efficient use of power resources. This may be especially useful with aircraft utilized for delivery operations, such as delivering packages, food, prepared food, and the like, reducing overall energy consumption cost. Each type of delivery may require a specific amount of energy. In another aspect, a software application (e.g., a business enterprise software application) may be utilized to calculate the required battery combinations necessary for the delivery (which may also include reserve energy). Again, the aircraft may be configured to automatically detect the combined C.G. position, and load this information into the controller which can in turn automatically adjust the position of the sweep of the first and second booms for the particular delivery.

Thus, the disclosed first embodiment of an aircraft having improved fail-operational functioning includes effectively the same number of propulsion system components as an equivalent quadcopter, but with increased power margin in reserve as necessary for fail-operational flight. But the disclosed aircraft provides fail-operational functioning in the event of failure of one or even two motors and/or propellers, or one driver, or one generator, whereas a quadcopter is rendered non-operational as a result of failure of any of these components. In other aspects, the aircraft may also be configured to utilize Epsilon Control to finely control aircraft pitch.

A second embodiment disclosed herein is directed to an aircraft which is also a twin fan, aircraft configured for fail-operational safety, similar to the above disclosed embodiment, except that the propulsion units are coupled to the fuselage in a different manner and each propulsion unit includes redundant motors and only a single propeller for enabling fail-operational safety. In one optional aspect, the aircraft may be configured for VTOL. The aircraft comprises a fuselage (i.e., main body of the aircraft) having a longitudinal axis extending from the rear to the front of the fuselage. A first propeller system and a second propeller system are disposed on opposite sides of the fuselage. The first propeller system and second propeller system are each mounted to the fuselage by a boom assembly coupled to the fuselage and extending outward of the fuselage on both sides of the fuselage. The boom assembly comprises a first boom extending outward of a first side of the fuselage and a second boom extending outward of the opposite side of the fuselage. In one aspect, the boom assembly comprises a first boom and a second boom connected to the first boom. For example, the first boom and second boom may be an integral element or two separate booms connected to each other. Alternatively, in another aspect, the first boom and second boom may be separate components that are not directly connected to each other.

In one aspect, the boom assembly is pivotally coupled to the fuselage such that the boom assembly can be pivoted to adjust the pitch of the first propeller system and second propeller system. In the separate first boom and second boom embodiment, the first boom may be pivoted independently of the second boom such that the first boom can be pivoted to adjust the pitch of the first propeller system and the second boom can be pivoted to adjust the pitch of the second propeller system, independently of each other. Alternatively, in the integral or connected boom embodiment, the entire boom assembly is pivoted to adjust the pitch of both the first and second propeller systems concurrently.

In another aspect, the first propeller system and second propeller system may be rotatably coupled to the boom assembly such that each propeller system can be independently rotated to adjust the pitch of the respective propeller system. This may be alternative to, or in addition to, the boom assembly being pivotally coupled to the fuselage. The first and second propeller system may be rotatably coupled to the boom assembly via respective pitch plates. In such case, the first propeller system is coupled to the first boom via a first pitch plate. The first pitch plate is rotatable to controllably adjust the pitch of the first propeller system. Similarly, the second propeller system is coupled to the second boom via a second pitch plate. The second pitch plate is rotatable to controllably adjust the pitch of the second propeller system. The single boom is pivotally coupled to the fuselage such that the pitch of both the first propeller system and second propeller system can be adjusted by pivoting the single boom.

Each of the first propeller assembly and second propeller assembly comprise a two motor and one propeller propulsion assembly, instead of the two-motor-propeller assembly of the first embodiment disclosed above. Thus, each of the first propeller assembly and second propeller assembly include an upper motor and a lower motor both coupled to a respective single propeller (i.e., one propeller for each propeller assembly). In one aspect, the upper motor and the lower motor of each propeller assembly are arranged coaxially with one vertically displaced from the other. For example, the two motors may be positioned vertically back to back.

Accordingly, each of the first propeller assembly and second propeller assembly includes redundant motors thereby enabling fail-operational safety functioning of the aircraft. For instance, if a motor in the first propeller assembly fails, a corresponding motor in the second propeller assembly is disabled. Then, the remaining operational motors, one in the first propeller assembly and one in the second propeller assembly, are powered at an increased level as required by flight conditions to accommodate for the failed and disabled motors. As another example of a fail-operational safety functionality, one motor on each side of the aircraft can fail (i.e., one motor in the first propeller assembly and one motor in the second propeller assembly). In this case, the two remaining operational motors, one in the first propulsion unit and one in the second propulsion unit, are powered at an increased level as required by flight conditions to accommodate for the failed and disabled motor-propeller assemblies. In either failure mode, the remaining two motors may be driven at higher power to provide rotation of the respective propellers approaching the velocity provided by all four motor.

In another aspect, the aircraft in this disclosed embodiment may also include redundant drivers for powering the motors of the motor-propeller assemblies to further facilitate fail-operational safety functioning of the aircraft. A first driver is coupled to one of the two motors on each of the first propeller assembly and the second propeller assembly, and a second driver is coupled to the other of the two motors on each of the first propeller assembly and the second propeller assembly. For example, the first driver may be coupled to the upper motor on the first propeller assembly and the upper motor on the second propeller assembly, and the second driver may be coupled to the lower motor on the first propeller assembly and the lower motor on the second propeller assembly. Alternatively, the respective drivers may be coupled to a respective upper motor on one of the propeller assemblies and a respective lower motor on the other of the propeller assemblies. The first driver and second driver are independent from each other such that the first driver is capable of driving its respective coupled motors independently of the second driver driving its respective coupled motors and the second driver is capable of driving its respective coupled motors independently of the first driver driving its respective coupled motors.

In another aspect, the use of the two drivers each coupled to respective motor-propeller assemblies on each of the first propeller assembly and second propeller assembly also provides redundancy in the event one of the drivers fails. For instance, in the event that one driver fails thereby disabling the two motors coupled to such driver, the remaining operational driver continues to power the two motors coupled thereto, one in the first propeller assembly and one in the second propeller assembly, at an increased level as required by flight conditions to accommodate for the disabled motor-propeller assemblies.

In yet another aspect, the drivers may be utilized to implement the fail-operational safety functionality in the event that a motor fails in one of the propeller assemblies, same or similar to that described above. If a motor fails in one of the propeller assemblies, the corresponding motor in the other propeller assembly coupled to the same driver as the failed motor can be deliberately disabled. This may be accomplished by disabling the driver coupled to the failed motor or other control or switch. Then, the other driver continues to power the remaining operational two motors, one in the first propeller assembly and one in the second propeller assembly, at an increased level as required by flight conditions to accommodate for the failed and disabled motor-propeller assemblies. In the case that one motor on each side of the aircraft fails (i.e., one motor in the first propeller assembly and one motor in the second propeller assembly), (a) if both failed motors are connected to the same driver, then such driver is disabled and the other driver continues to power the remaining operational two motors, one in the first propeller assembly and one in the second propeller assembly, at an increased level as required by flight conditions to accommodate for the failed and disabled motor-propeller assemblies; or (b) if the failed motors are connected to different drivers, both drivers remain active and each driver powers the respective remaining operational motors, one in the first propeller assembly and one in the second propeller assembly, at an increased level as required by flight conditions to accommodate for the failed and disabled motor-propeller assemblies.

In still another aspect, the aircraft may also include redundant power systems for powering the motors and other aircraft components and systems, same or substantially similar to the first embodiment described above, for enabling fail-operational safety functionality of the aircraft in the event of failure of one of the power systems.

In still another aspect of this disclosed embodiment, the aircraft further comprises a controller operably coupled to the first driver and the second driver. The controller is configured to independently control the first driver and second driver in order to independently control the operation of each of the propeller assemblies. In another aspect, the controller is further configured to provide fail-operational functionality of the aircraft in the event of failure of one of the motors, propellers, drivers or switches, as described herein. In several optional aspects, the controller may also be configured to provide fail-safe operation of the aircraft. This may include fail-safe modes programmed into the controller to cope with multiple failures caused by extreme external hazards and/or aircraft system fail failures. For example, fail-critical is present when only a single string remains in the switch and controller similar to a range safety mode this may necessitate parachute deployment. Accordingly, in one aspect, in the event of a failure preventing the aircraft from completing its intended mission, the controller puts the aircraft into a fail-critical or fail-safe mode which may deploy a parachute to minimize damage to the aircraft and life and property in the landing site.

Accordingly, the disclosed second embodiment of an aircraft having improved fail-operational functioning includes effectively fewer propulsion system components as an equivalent quadcopter, but with increased power margin, in reserve as necessary for fail-operational flight. In addition, the disclosed aircraft provides fail-operational functioning in the event of failure of one or even two motors, or one driver, or one generator, whereas a quadcopter is rendered non-operational as a result of failure of any of these components.

Flight power is delivered to the air via propellers. In another aspect, the propellers may incorporate blade pitch modulation. Typical drones vary propeller RPM (rotations per minute, i.e., rotational speed), however maximum tip speed limits maximum power available. During an emergency landing additional lift is provided via blade pitch modulation.

Additional and other objects, features, and advantages of the improved aircraft disclosed herein are described in the detailed description, figures and claims.

BRIEF DESCRIPTION OF THE DRAWINGS

FIG. 7A schematically illustrates inertial coupling in prior art quadcopters and FIG. 7B schematically illustrates reduced inertial coupling in the aircraft embodiments disclosed herein;

FIGS. 8A, 8B, 8C, and 8D are each a Venn diagram illustrating sets and subsets of operating states for the aircraft embodiments disclosed herein;

DETAILED DESCRIPTION

Figure 1:
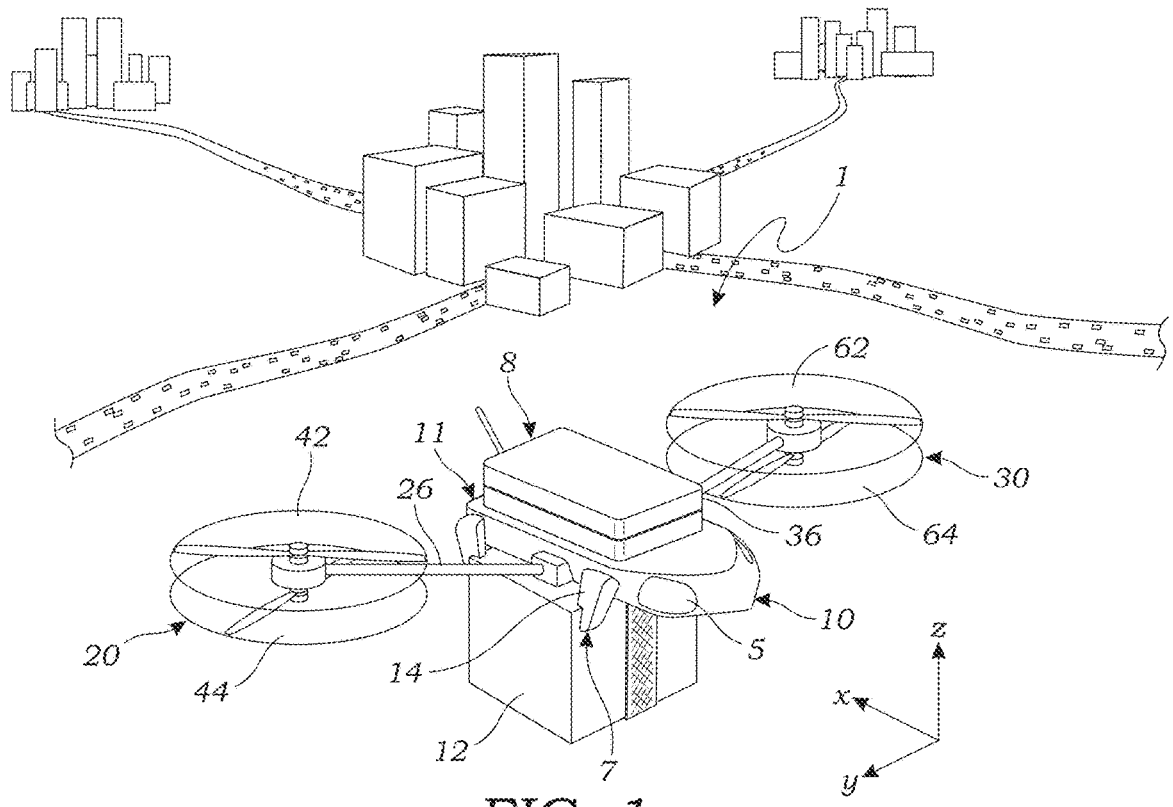
FIG. 1 is a perspective illustration of an aircraft according to one embodiment disclosed herein.

The present subject matter relates to an improved aircraft having fail-operational performance. In one optional feature, the aircraft may be configured for vertical lift, for example, to enable VTOL. The present arrangement is more efficient and more reliable than current quadcopter drones, which have four separate fans at each corner of a nominally square envelope. It is also more efficient than current multi-prop drones which have six or more coaxial motors and fans. In the present subject matter, an embodiment including four motor-fan assemblies is provided. A twin fan arrangement is provided in each propulsion unit. A first propulsion unit, two motor-prop assemblies, is supported to a starboard side of an aircraft. A second propulsion unit is supported to a port side of an aircraft. In each propulsion unit, a first motor and a second motor are coaxially mounted along an axis at or near the direction of lift. A first fan and a second fan are coaxially mounted on opposite vertical sides of the pair of motors. This construction provides a twin fan, redundantly configured VTOL aircraft.

In aeronautics, inertial coupling is a potentially catastrophic phenomenon of high-speed flight which can cause the loss of aircraft and pilots in the absence of control features to counter it. Inertial coupling is an inherent characteristic that reduces stability of an aircraft executing particular maneuvers which include rolling the aircraft. Inertial coupling occurs when an aircraft is quickly rolled about an axis other than its flight velocity vector. In fixed wing aircraft, design compensation requires increased wing and tail surface areas. The tendency can be countered by a number of strategies which include limiting allowed roll rates and duration, and also limiting angle of attack for performing said roll maneuvers. While in the case of quadcopter drones, catastrophic failure is much less likely to occur than in high speed aircraft, excursions and oscillations during maneuvers must be avoided that typically evolve from both inertial and aerodynamic coupling, as determined by the several aerodynamic constants and inertial moment ratios.

Multi-prop drones are currently flown within a wide range of conditions, mission intent and objectives. However, as their use increases and expands into a wider range of opportunities, they may discover operational limitations, which are derived from their fundamental limitations.

Inertial coupling creates oscillatory dynamics, requiring more control power "integrated over time," which depletes battery power while performing basic mission functions. The presently disclosed aircraft are advantageous because such aircraft reduce the degree of inertial coupling of the motors and the payload, while demands on motor power are further reduced by providing for optional, dynamic pitch control of rotating blades.

Reduction of inertial coupling combined with redundant design, interact to provide a reliable aircraft with a maximized flight time thru minimized weight penalties, that is fail-operational in the event of a motor failure. The advantage is that having twin fans, allows shutdown of two of four motors in response to failure of a symmetrically placed motor, which provides for substantially normal operation with the remaining symmetrically placed motors operating at higher a power levels per emergency power system limits.

The twin fan design of the aircraft disclosed herein also decreases stored energy, in the short-period pitch-mode oscillations by minimizing pitch inertia, Iyy (see FIG. 7B), while also minimizing multi-axis inertial coupling, as compared to previous aircraft. By placing the twin motors together, off-trim pitch conditions resulting from a motor failure, are minimized to within acceptable pitch trim control limits thru Epsilon Control and rapid sweep adjustments. Overall, steady state, control power requirements are reduced by reducing inertial coupling.

The aircraft disclosed herein may comprise a twin fan with a dual power supply for redundancy embodied in an efficient manner. If an upper motor on the port side (i.e., the left side) of the aircraft fails, a control circuit will disable the upper motor on the starboard side (i.e., the right side). Power that was directed to the upper motors is routed to the lower motors and the lower motors are operated at an increased power level. Fail-operational performance is provided.

Accordingly, in some embodiments disclosed herein, an efficiently configured VTOL aircraft is provided, which achieves peak reliability thru use of propulsion provided by motors through redundancy and the inherent physics embodied in the design feature arrangements and control systems approach.

Another advantage of some aircraft embodiments disclosed herein is the provision of redundant power supplies. Separate generators may be provided for each fan module. The generators each charge batteries, via redundant switches that route power redundantly to two motor drivers which operate symmetrically disposed fan units. Electronic switching is provided so that in the event of failure of one generator, both batteries can be connected to the input of the operating drivers. This arrangement facilitates "fail operational" flight with a safe, minimized-risk landing. Functionally, since twin motors are included in one propulsion unit, off-trim pitch conditions are minimized and maintained within acceptable swept boom limits. In aviation, the short-period mode is a usually heavily damped oscillation with a period of less than a few seconds. The motion is a rapid pitching of the aircraft about the center of gravity, essentially an angle-of-attack variation. The time to dampen the amplitude to one-half of its value is usually on the order of 1 second. Pilot-Induced Oscillations (PIO) are rare, unexpected, and unintended excursions in aircraft attitude and flight path caused by anomalous interactions between the aircraft and pilot. Control features of the twin fan VTOL concept address these concerns through software and multi-mode, control-gain scheduling.

Figure 2:
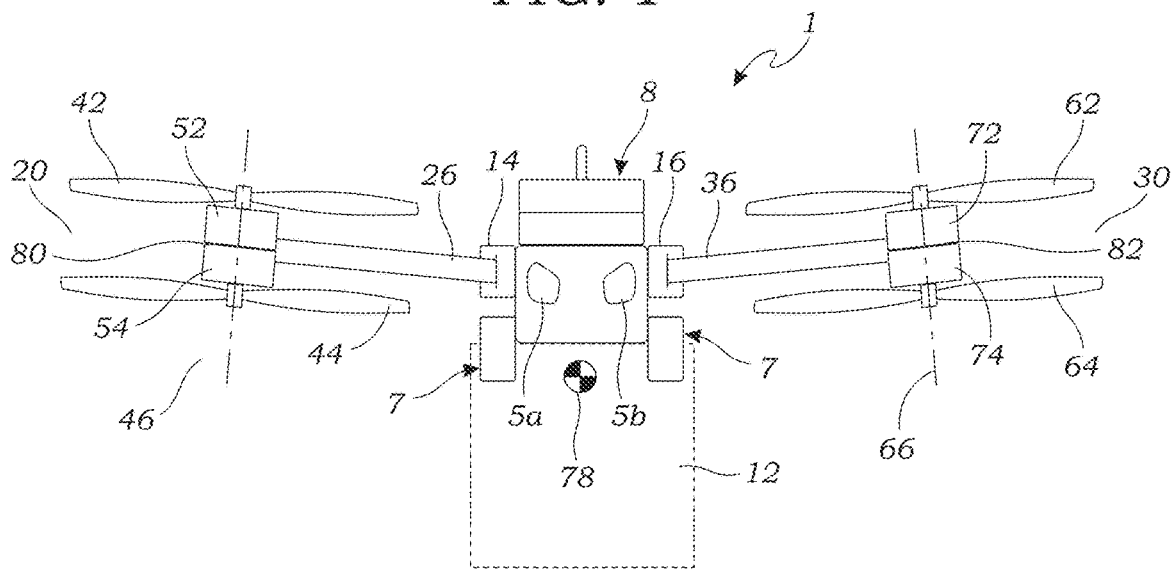
FIG. 2 is a front elevation of the vehicle of FIG. 1.
Figure 3:
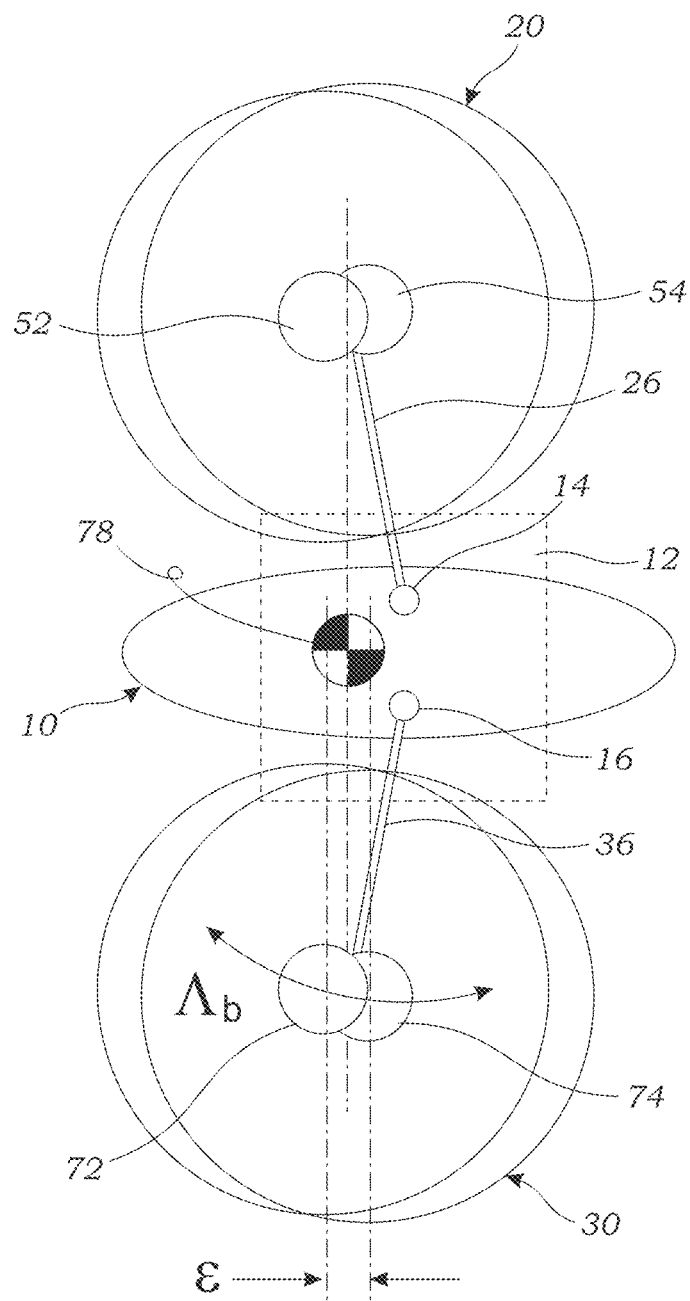
FIG. 3 illustrates an embodiment of a motor-propeller arrangement of the aircraft of FIG. 1 which provides for dynamic control using boom sweep and differential power via Epsilon Control.

Turning now to the drawings, FIGS. 1-3 illustrate one embodiment of an aircraft according to the present disclosure. FIG. 1 is a perspective illustration of an aircraft 1 incorporating the present subject matter. The aircraft 1 of FIGS. 1-3 is configured as a drone (autonomous or remote piloted), with the understanding that the aircraft 1 may also be configured as onboard piloted aircraft (i.e., a manned aircraft). The aircraft 1 may also be configured to carry one or more passengers, as a drone or as an onboard piloted aircraft.

FIG. 2 is an elevation of the drone 1 of FIG. 1. The aircraft 1 comprises a fuselage 10 (i.e., main body of the aircraft 1) having a front (i.e., fore), a rear (i.e., aft), a left side (i.e., port side) and a right side (starboard side), and a longitudinal axis extending from the rear to the front of the fuselage 10. In unmanned embodiments (i.e., drone embodiments), an external payload 12 may be provided via quick access, attachment and release hardware 7. Propulsion is provided by a first propulsion unit 20 and a second propulsion unit 30 disposed on opposite sides of the fuselage 10. The first propulsion unit 20 is mounted to the fuselage 10 by a first swept boom 26. A first pivot constraint 14 couples the first swept boom 26 to the fuselage 10 such that a sweep angle of the first boom 26 relative to the longitudinal axis is adjustable. The second propulsion unit 30 is mounted to the fuselage 10 by a second swept boom 36. The second swept boom 36 is pivotally mounted to the fuselage 10. A second pivot constraint 16 couples the second swept boom 36 to the body 10 such that a sweep angle of the second boom 36 relative to the longitudinal axis is adjustable. The structure of the aircraft 1 may be substantially symmetrical about a XZ plane intersecting the length of the fuselage 10.

Dihedral is a physical measurement related to angle of wings with respect to a horizontal plane. In aircraft, dihedral is necessary to counteract a center of gravity above a wing. Generally dihedral is an effect of overall aero-surface arrangements that provides directional stability when an aircraft encounters lateral gusts. In the present embodiment, effective dihedral is a function of the angle of the swept booms 26 or 36. For helicopters the center of gravity is typically 15% of blade diameter, below the blade disc. During package delivery, there will be times when the cg moves vertically upward, such as after package drop-off, and therefore inherent dihedral may be required.

Payload attachments 7 are located near the payload 12 and may take many forms, according to the payload's size, weight, delivery requirements, distance, duration and environment. Several examples may include: tethered payloads, multiple smaller payloads delivered over a course of minutes, or high drag packages, in cold or light-rain conditions.

Removable and rechargeable batteries 8 are attached and stacked onto the fuselage 10 according to the payload-range requirements for a given payload delivery task. These adjustable battery stacks 8 allow for tailored power consumption, with "mix and matched" capacities, that over a lifetime of use will dramatically reduce the aircraft's operational cost. For example, the aircraft may be utilized as a delivery drone 1 in which the decreasing the operational cost improves the competitive advantages of the drone 1. The compatible batteries may include batteries having a plurality of different capacities so that the batteries can be mixed and matched in the battery stacks 8 to provide a wide range of different combined capacities for the battery stack 8.

Lastly, a parachute compartment 11 is located in the aft portion of the fuselage 10. A parachute will deploy in a specific emergency or due to required range safety limitations.

Table 1 below discloses a set of parameters defining one preferred embodiment of the aircraft 1 as configured for external package delivery (e.g., a package delivery drone). This embodiment is intended for minimal weight missions, namely a drone having an operating weight empty (OWE) of less than 20 kg and with speeds below 70 mph (110 kph).

TABLE 1

| External Package Delivery | |
|---|---|
| Twin Fan VTOL | ~20 kg, TOGW |
| Span | ~2.2 m |
| Fan Diameter | ~0.9 m |
| Disc loading | <4 kg/m 2 |
| Payload | ~4 kg |

During delivery operations the first and second booms 26 and 36 are easily and auto adjusted before and during flight to accommodate a range of packaging weights and C.G. locations.

The first propulsion unit 20 and the second propulsion unit 30 each comprise what is called for purposes of the present description a twin fan redundantly configured unit. More specifically, the propulsion unit 20 comprises an upper starboard propeller 42 (i.e., a first upper propeller 42) and a lower starboard propeller 44 (i.e., first lower propeller 44). The upper starboard propeller 42 and the lower starboard propeller 44 are substantially parallel. In the illustrated embodiment, the upper starboard propeller 42 and lower starboard propeller 44 are coaxially disposed on an axis 46. In an alternative embodiment, the relative position of the propellers 44 and 46 may be configured in accordance with an "Epsilon Control" (EC) which is described with respect to FIG. 3 below. As described below and schematically shown in FIG. 3, the upper starboard propeller 42 is rotatable about a first upper axis 43 and the lower starboard propeller 44 is rotatable about a first lower axis 45, wherein the first upper axis 43 is offset by a first Epsilon distance & from the first lower axis 45 in a direction parallel to the longitudinal axis. In one embodiment, the first Epsilon distance & is greater than zero and less than the lesser of: (a) 10% a diameter of the upper starboard propeller 42, and (b) 10% of a diameter of the lower starboard propeller 44. An upper starboard motor 52 (i.e., first upper motor 52) is mounted to drive the upper starboard propeller 42, together forming an upper starboard motor-propeller assembly (i.e., first upper motor-propeller assembly). A lower starboard motor 54 is mounted to drive the lower starboard propeller 44, together forming a lower starboard motor-propeller assembly (i.e., first lower-motor propeller assembly).

Similarly, the propulsion unit 30 comprises an upper port propeller 62 (i.e., second upper propeller 62) and a lower port propeller 64 (i.e., second lower propeller 64) The upper port propeller 62 and the lower port propeller 64 are substantially parallel. In the illustrated embodiment of FIGS. 2 and 3, the upper port propeller 62 and the lower port propeller 64 are coaxially disposed on an axis 66. The axis 46 and the axis 66 can intersect a vertical plane at the same point. The line would comprise a body-centered axis. The angle of the axis 46 and axis 66 with respect to a vertical direction constitutes fan pitch. In an alternative embodiment, the relative position of the propellers 62 and 64 may be configured in accordance with EC as described with respect to FIG. 3 below. As described below and schematically shown in FIG. 3, the upper port propeller 62 is rotatable about a second upper axis 63 and the lower port propeller 64 is rotatable about a second lower axis 65, wherein the second upper axis 63 is offset by a second Epsilon distance & from the second lower axis 65 in a direction parallel to the longitudinal axis. In one embodiment, the second Epsilon distance & is greater than zero and less than the lesser of: (a) 10% a diameter of the upper port propeller 62, and (b) 10% of a diameter of the lower port propeller 64. An upper port motor 72 (i.e., second upper motor 72) is mounted to drive the upper port propeller 62, together forming an upper port motor-propeller assembly (i.e., second upper motor-propeller assembly). A lower port motor 74 is mounted to drive the lower port propeller 64, together forming a lower port motor-propeller assembly (i.e., second lower motor-propeller assembly The upper starboard propeller 42 is mounted to one side of a first motor support attachment 80, and the lower starboard propeller 44 is mounted to an opposite side of the first motor support attachment 80. Optionally, the first motor support attachment 80 may be rotatable such that a pitch of the first propulsion unit 20 may be adjustable. The upper port fan 62 is mounted to one side of a second motor support attachment 82, and the lower port fan 64 is mounted to an opposite side of the second motor support attachment 82. Optionally, the second motor support attachment 82 may be rotatable such that a pitch of the second propulsion unit 30 may be adjustable.

FIG. 1 and FIG. 2 illustrate structure which enables employment of principles of aerospace design and physics to achieve the benefits of increased reliability, cost effectiveness, and safety. The present structure enables the aircraft to use both physical phenomena and efficient redundancy to manage vertical flight forces and dynamics.

FIG. 3 is a top or plan view of the aircraft 1 that displays the arrangement of motor-propeller units as positioned on the boom. During payload 12 installation and release, the center of gravity (CG) 78 can be expected to move in all three dimensions. Because during typically half its flight (mission profile) the drone 1 can expect to have no payload, the CG will be stable and within the volume of the drone 1. However, after takeoff and during delivery the CG will be lowered by the payload's mass and has the potential to shift fore, aft and laterally. Alternately, based on flight range requirements, the addition of batteries (or fuel) may also move the CG forward, aft and vertically.

Prior to takeoff a flight control computer (FCC) of the aircraft 1 will assess thru varied means, the exact location of the combined drone and payload assembly CG, and then thru servo control, adjust the boom sweep of the first swept boom 26 and second swept boom 36, gamma, $A_B$, to bracket the C.G. within the bounds of Epsilon. The ability to self-balance using integrated sensors, both visual and inertial is a primary enabler of the boom sweep and epsilon control approach.

FIG. 3 displays the placement of motors 52, 54, 72, 74 and their respective propellers 42, 44, 62 and 64, with the top propellers 44 and 62 attached to motors 52 and 72 staggered forward of the bottom propellers 44 and 64, respectively. This stagger distance is referred to as "installed epsilon", and varies proportionally with the cosine of boom sweep.

On helicopters the cyclic controls maneuvering. The cyclic is also referred to as the "stick." The movement of the stick alters the tilt of the rotor disc. The function of cyclic is generated in the present embodiment thru differentially thrusting propeller force, thru RPM changes or in combination with servo adjusted propeller blade pitch, and about a fixed moment arm Epsilon, as part of an overall "Epsilon Control" methodology.

This technique mimics the cyclic effect commonly utilized in helicopters, but without cycling blade pitch mechanisms to control attitude, maneuvers or trim. Since the cyclic effect is achieved by electronic means in the proposed embodiments, the complex rotor control mechanisms are eliminated. The elimination of swashplates effectively increases reliability thru reducing mechanical complexity and weight.

The motors are flipped to permit propeller clearance of support booms. This allows for adjustable in-plane staggering relative to the other. The motors are counter rotating to zero-out angular momentum and gyroscopic macro-control reactions. The booms must be stiff enough to resist several flutter modes, including "whirl". It may be that in descent, energy will be dumped from the airstream into the propulsion system. Potential overspeed conditions and high speed flutter modes will require investigation and necessitate placard limits.

The present specification creates the term "Epsilon Control" (EC) to describe the differentially thrusting propulsion units via RPM or propeller pitch, establishing a fixed moment arm about the body center mass 78. The term "Epsilon Torque" describes a torque applied from this fixed moment arm. Epsilon Control refers to the operational aspects achieved through the use of this offset distance, Epsilon. This arrangement is significant in that it allows for both high pitch damping and "precision pointing" by countering fan-boom trim dispersions with Epsilon Torque. It is mechanically simpler and therefore more reliable, than existing helicopter swashplate mechanisms.

The value Epsilon, $\varepsilon$ is expressed as the offset normals in 3D space, about the combined center of gravity (drone+package) which defines the differential torquing-arm about the pitch axis. The larger the value of Epsilon, the less differential power is required to affect a given pitch rate. Epsilon is used as a "fine" control, while boom sweep is used to maneuver, trim and "zero-out" course payload imbalances.

During a motor-fail event, the epsilon effect instantly compensates for approximately ½ $\varepsilon$ at increased power, via rapid power adjustments. During this event, the twin fan booms 25 and 36 rapidly move to the appropriate cg-aligned location via sweep adjustments, $A_B$, as shown in FIG. 3. Efficiency in use of the remaining control margins as assessed by onboard controllers, is vital to providing fail-operational functioning. In some cases there may be multiple failures, resulting in fail-safe operation.

Epsilon Control is employed to augment stability and to dampen pitch oscillations. In the case of quad systems, additional stabilization is required in order to provide high definition video and prevent blurring of still photography. EC benefits will include improving video stability provided to the on-board camera. In typical video applications, stabilizing motors and additional electronics increase the weight of high definition video payloads. In First Person View (FPV) applications the increased stabilization will benefit the pilot's flying experience.

In aircraft, the preferred static margin, i.e., the distance between aero center and mass center, is governed by the pilot's ability to fly the airplane. This distance, static margin (SM) is based on inherently human control gains. If an SM is too small the pilot cannot react quickly enough to stabilize the plane. When an SM is too large, the tail surfaces required for trim become too large, adding to the drag of the airplane, and which may exceed the pilot's strength. Similarly, Epsilon Control relies on the increased capability of the digital flight control system to easily augment pitch stability at shorter periods of control (higher frequency dynamics). Effectively two sets of response constraints exist: one for the pilot and one for the "machine".

When a drone is carrying a slung load, the dynamic modes are typically aggravated. This motion is a driven, independent pitching of the drone body about the center of gravity, essentially a relative angle-of-orientation variation between the propellers and the fuselage. Epsilon Control gains can be adjusted to better manage this recurrent flight mode in cargo delivery, thru a combination of cycling boom sweep in coordination with Epsilon Control moments to mitigate this flight mode by creating, in-plane x-axis motion at the tether's attachment to the vehicle.

The possible control combinations are numerous. Therefore, the examples treated here are to be considered exemplary as they teach the approach to other control combinations. When fan assemblies are disposed angularly with respect to each other with "dihedral" as in FIG. 2, mixing of angular momenta may be useful to all rotational degrees of control. EC provides for effective fine control of flight moments, which are sensitive to rapidly changing conditions.

In operation, air vehicle pitch trim is controlled and adjusted with a trim wheel. Control also depends on instrumentation integrated into control mechanisms and visual information provided to the pilot. In the present subject matter, the concept of rotor position and the use of Epsilon control power, facilitates an additional control option of attitude trim during upset conditions. In the present context, control refers to a set of piloting gains, sensor gains, and feedback gains related to physical features of the aircraft.

Figure 4:
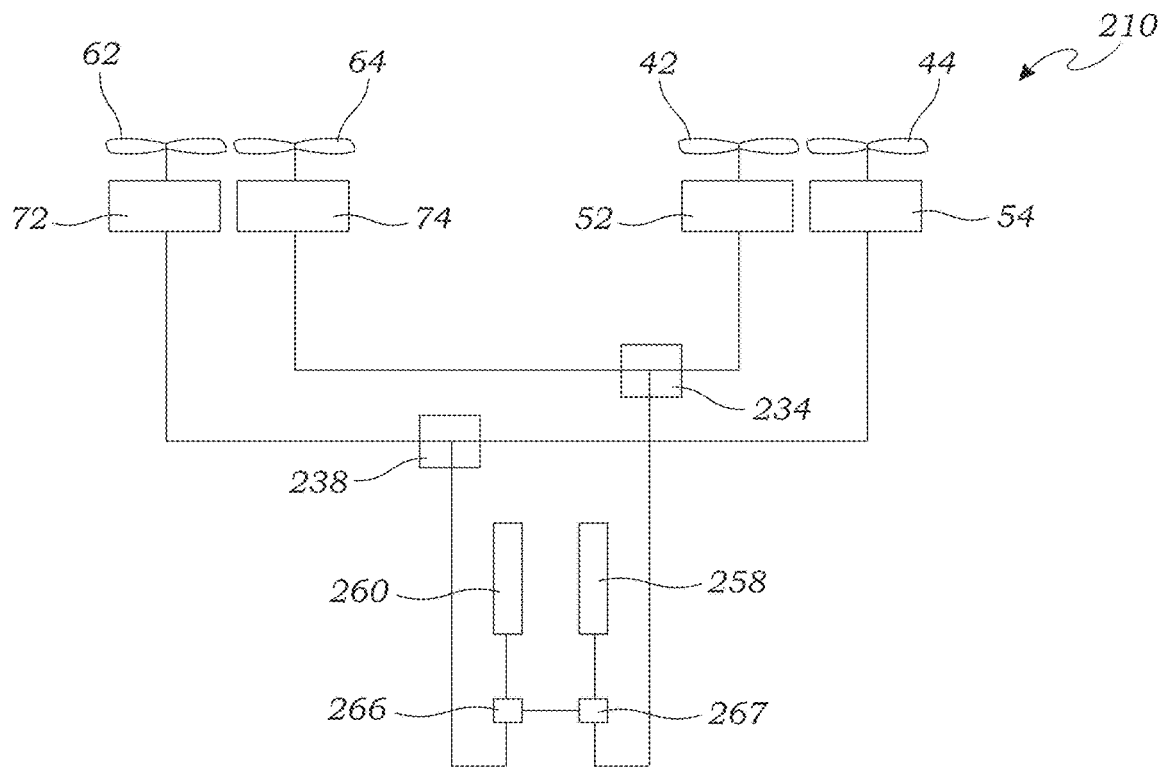
FIG. 4 is a block diagram of one embodiment for a fail-operational, redundant power system for the aircraft disclosed herein.
Figure 5:
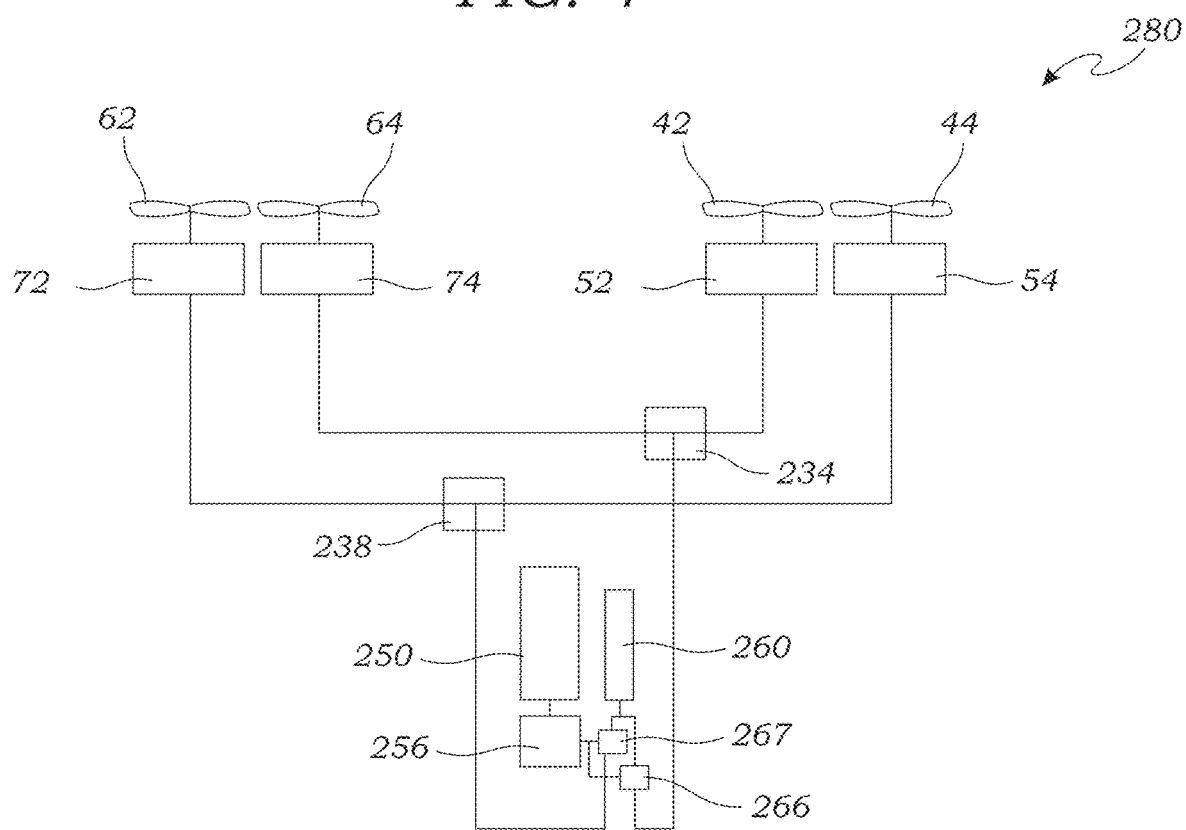
FIG. 5 is a block diagram of another embodiment for a fail-operational, redundant power system for the aircraft embodiments disclosed herein.

FIG. 4 and FIG. 5 are each a block diagram of a fail-operational, redundant power system incorporating twin fans driven by motor pairs, such as used in the aircraft 1. The second arrangement of FIG. 5 is considered a "hybrid" propulsion system, allowing for both generator and/or battery powered flight. Hybrid power allows for boosted takeoff performance, where the battery and generator work together. A twin hybrid system for larger drones (or aircraft) is not shown.

Figure 6:
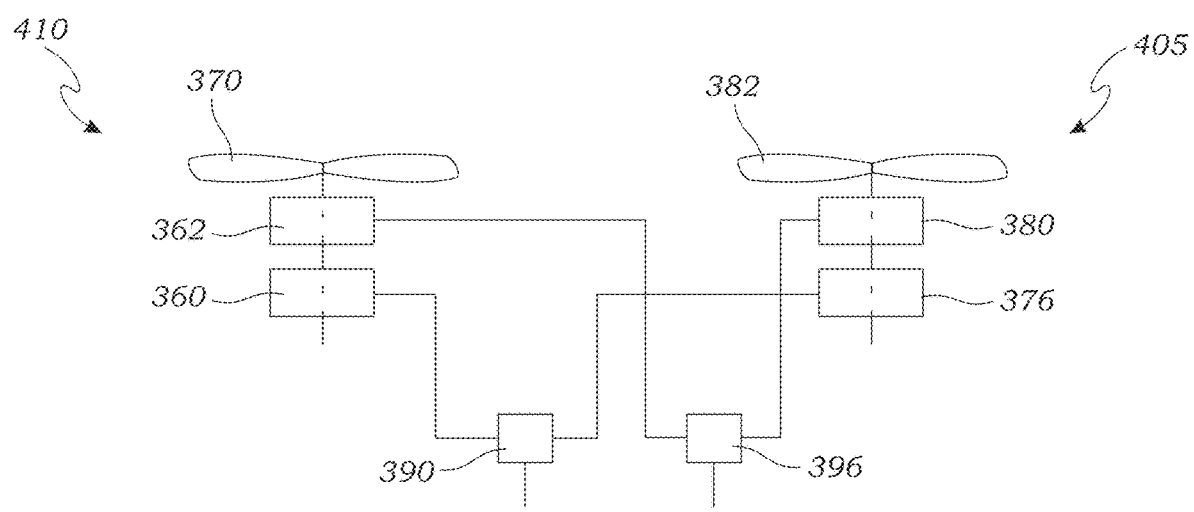
FIG. 6 is a block diagram of another embodiment of a fail-operational, redundant power system for the aircraft embodiments disclosed herein.

FIG. 6 is a block diagram of a minimally redundant twin fan propulsion system, where two motors drive single propellers.

In aircraft, fail-operational flight is significantly different from fail-safe. In a fail-safe system, after a failure is detected, the system can operate with reduced functionality for a limited period of time without harm to the participants. This enables alternate means of survival such as ejection from the vehicle. In a fail-operational mode, after a failure, action is taken in the system to ensure continued functionality and safe terminal operations such as a safe landing concluded within a specified window of time and physical constraints. An example of a fail-operational system is one in which redundant flight components, for example, motors, are provided. However, it is important that fail-operational service is provided with "least cost" to the system. For example, a redundant system in an aircraft should not add significant weight that precludes cost-effective operation.

In FIG. 4, the fan motors and power generators are shown as two separate entities. Accordingly, as shown in FIG. 4, a power system 210 for the aircraft 1 comprises the upper starboard motor 52, the lower starboard motor 54, the upper port motor 72, and the lower port motor 74. The motors 52, 54, 72 and 74 drive their respective propellers 42, 44, 62 and 64. A first driver 234 provides power and control signals to the upper starboard motor 52 and the lower port motor 74. A second driver 238 provides power and control signals to the lower starboard motor 54 and the upper port motor 72. Power is provided by two (or more) batteries 258 and 260. The batteries are selectably connected to the motors 52, 54, 72 and/or 74 via switching circuits 266 and 267. This arrangement provides port-starboard redundancy.

FIG. 5 illustrates a power system 280 for the aircraft 1, which is similar to the power system 210, except that the power system 280 is a hybrid power system utilizing a generator motor 250 which drives a generator 256 to produce electric power. The generator motor 250 may be a chemical fuel powered motor such as a combustion engine, internal combustion engine, or the like. The generator motor 250 drives the generator 256 which produces electric power to charge a first battery 260 via battery switching circuits 266 and 267. The battery 260 and generator 256 are connected to the drivers/controllers 234 and 238 via redundant battery switching circuits 266 and 267 respectively. This provides a hybrid system wherein the battery power from the battery 260 may supplements the electric power from the generator 256, or solely power, the motors 52, 54, 72 and/or 74. For example, the battery 260 may be used to supplement the generator 256, or solely power, the aircraft 1 to enable takeoff and landing. The hybrid power system 280 may optionally include redundant generator motors 250 and redundant batteries 260, connected to the switching circuits 266 and 267 in order to provide fail operational functioning of the power system 280 in the event of failure of one or more of the components of the power system 280.

The systems 210 and 280 provide fail-operational functionality in the event of a motor failure. If one of the motors 212, 214, 216, or 218 fails, the other motor connected to the same driver may be deliberately disabled. The battery switching circuit 266 then connects the batter(ies) 260 to the driver 234 or 238 to power the two motors that are operative. The two motors now operating are driven at higher power to provide rotation of the respective fans to approach the velocity provided by all four motors.

Figure 9:
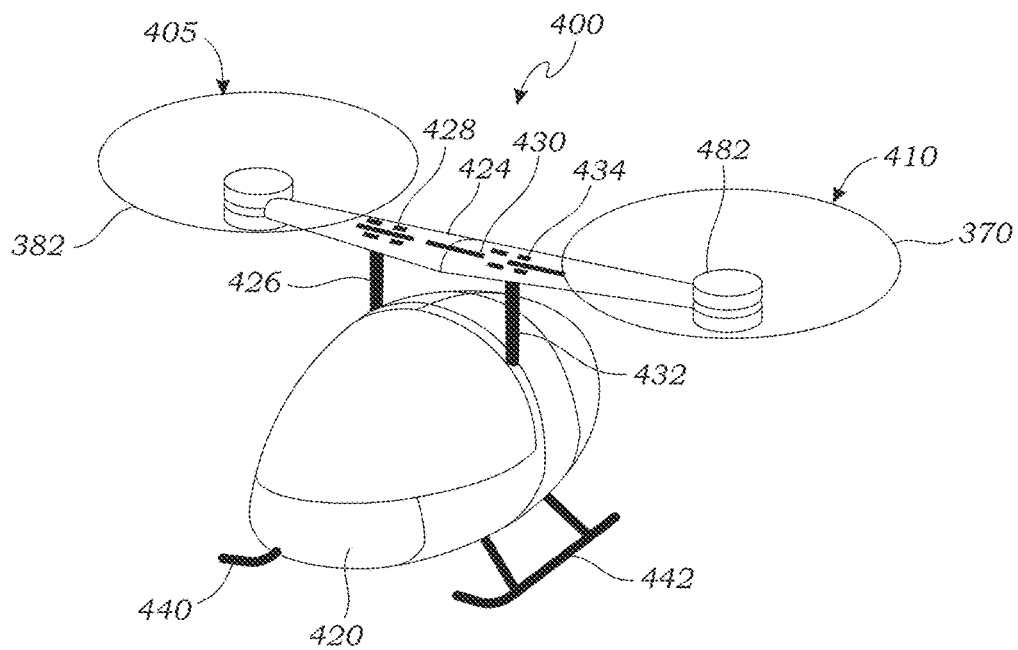
FIG. 9 is an isometric view of an aircraft according to another embodiment disclosed herein.

FIG. 6 is a block diagram of a twin fan propulsion system for an aircraft, such as the aircraft 400 of FIGS. 9-10, in which two motors are provided for each of two propellers. This embodiment may utilize power systems 210 and 280 of FIG. 4 and FIG. 5, including the battery switching circuits and batteries. A first pair of motors 360 and 362 (e.g., a lower port motor 360 and an upper port motor 362) are disposed coaxially and drive a first propeller 370. A second pair of motors 376 and 380 (e.g., a lower starboard motor 376 and an upper starboard motor 380) are disposed coaxially and drive a second propeller 382. A first controller 390 (also called a driver 390) is connected to the port motors 360 and 376. A second controller 396 (also called a driver 396) is connected to the starboard motors 362 and 380. If one of the upper motors 362 or 380 fails, the other upper motor connected to the same controller may be disabled. The remaining lower motors now operating are driven at higher power to provide rotation of the respective propellers to approach the velocity provided by all four motors. Batteries and power generators are not illustrated in FIG. 6. They may be configured as in one of the prior embodiments shown in FIGS. 4 and 5.

The various power system embodiments will generally operate under nominal flight conditions. In nominal flight mode, the motors are operated at about 55% of capacity. The remaining 45% of capacity is reserved for continuing operation of motors when a primary propulsion component fails.

One benefit of a hybrid systems is that during takeoff, both the generator sets and batteries work together providing excess power for endpoint operations. The power for both propulsion modules may be above their maximum continuous ratings, albeit for a limited amount of time.

Engine-out survivability impacts pitch control in that sudden changes to trim conditions must be corrected quickly to permit continued fail-operational flight. The present subject matter integrates features and effectors that provide the highest reliability and minimized pilot workload with the least impact to empty weight. There exist failure combinations that will result in fail-safe flight, but these are outside the scope of dual redundancy and the primary synergistic integrations presented in the embodiments.

Stable hovering during takeoff and landing requires precise position control in an often restricted space and/or flight envelope. This necessitates control features with unique capabilities for both piloted and unmanned operation. A high level of control sensitivity is required to decouple control forces motion. This level of control is achieved by sensing the drone's location relative to nearby objects and terrain. The control inputs essentially function like an airplane at all times with the addition of a collective control arm while in hover. The yoke or stick continues to function as a rate input device for all rotations.

FIGS. 7A and 7B address reduction of inertial coupling in accordance with the present subject matter. Inertial coupling is a dangerous effect which can undermine aircraft maneuvering and control, and is primarily caused by the laws of conservation of angular momentum. Inertial coupling tends to occur in an aircraft with the weight distribution primarily along the x-axis that is pitched or rolled abruptly about an axis other than its flight velocity axis. The twin rotor arrangement of the present subject matter reduces inertial coupling by decreasing pitch inertia relative to roll inertia by an order of magnitude.

The turbulent air surrounding any flight vehicle can be described mathematically as a power spectral density function of air velocities. Power spectral density (PSD) is the measure of a signal's power content versus frequency. A PSD is typically used to characterize broadband random signals. The PSD function shows the strength of the variations as a function of frequency. Values of PSD may describe the level of turbulence. There is consequently a certain level of turbulence beyond which any specific aircraft cannot remain flyable. Its pilot simply does not have the human force×displacement/time(=pilot or control system power) to correct for turbulent or upset conditions generated by potentially extreme, dynamics-driven environmental conditions. Inertial coupling, compounds these concerns by easily transferring energy from one dynamic mode into another without adequate damping.

FIG. 7A is a diagram illustrating inertial moments that influence inertial coupling for a prior art, quad-rotor aircraft. FIG. 7B is a diagram illustrating inertial moments reduced by design and decoupled for a twin rotor aircraft according to the present subject matter.

FIGS. 7A and 7B compare the mass moments of inertia between the "quad" and "twin fan" arrangements. From a system's point of view "quads" by their inherent arrangement, have the highest degree of cross-coupling, that results in increased control power demands which accompany even their most basic and minimal flight maneuvers. When flying in low levels of turbulence there is always a minimal measure of required control power which drains energy from the vehicle's power reserves which can be considered a control-energy-tax. This inherent inefficiency is always amplified by inertial coupling. Assured damping of body-mode energy received from the surrounding air stream is vital to passenger comfort, because air sickness can easily affect occupants in smaller aircraft, while for drones, payloads may impose specific dynamic requirements.

In FIG. 7A, the quad motors are each disposed so that the intersection of their respective axes of rotation with the X-Y plane define a square that is symmetrical with respect to an origin O at the intersection of the X axis and Y axis. For a quad, a line segment from one rotation axis to one motor center, i.e., axis of roll rotation, X, has a length R. The distance from any motor center to the Z orthogonal axis is RZ. Line segment OC is the hypotenuse of a right triangle. Therefore, R=0.71 RZ.

FIG. 7B demonstrates a geometry in which the maximum value of $R_Z$ is reduced, thereby, lowering inertia about the z axis, and the overall inertia tensor.

In the following equations the following symbols are used:
Ixx is inertia in the roll degree of freedom
Iyy is inertia in the pitch degree of freedom
Izz is inertia in the yaw degree of freedom
me is mass of the motor
Inertial coupling is expressed as follows:

$Ixx = 4meR2$ (roll)

$Iyy = 4meR2$ (pitch)

$Izz = 4me2R2$ (yaw)

Pitch=4meR2

In the arrangement of FIG. 7B, the centers of the motors each lie in the Y-Z plane. The distance R from the center of each motor and the Z axis is the same.

In this arrangement:

$Ixx = 4meR2$ (roll)

$Iyy = 4Ie$ (pitch)

$Izz = 4meR2$ (yaw)

Pitch=4Ie where Ie=motor, local rotational inertia

Significant reduction in pitch inertia, as provided by the present subject matter, also maximizes the separation of vehicle modal frequencies. Modal analysis is the process of determining the inherent dynamic characteristics of a system in forms of natural frequencies, damping factors and flight trajectory mode shapes, and using them to formulate a mathematical models for dynamic behavior. Natural frequency is the frequency at which a body tends to oscillate in the absence of any external or internal damping force. The present system's structure creates higher modal frequencies about the y-axis. Dynamic damping constants are proportional to the frequencies, and therefore increasing a modal frequency increases damping in that mode.

Because the prior art, quad motor arrangement has greater inertial coupling, it is more resistant to control commands. Consequently, increased power consumption through heavier motors relative to the proposed embodiment is evident.

Current VTOL drones lack optimization in several ways, and this is due to the broad scope of their application. However, in certain applications optimization may be essential for commercial success. The primary focus of these embodiments are redundancy, safety, novel control methods and reliability, which certainly will benefit the bottom line.

FIGS. 8A, 8B, 8C, and 8D are each a Venn diagram illustrating sets and subsets of operating states in order to provide a qualitative view of operation. The operating states for the embodiment of FIG. 8 are illustrated as follows:
FIG. 8A—Normal Flight
  Set 1A/Normal power is set at ~55% of maximum power; effective pitch is ~14°-16°
  Subset 1B/Reduced power
  Subset 1C/Endpoint flight, TO, max non-continuous power FIG. 8B—Single Motor-out (EO), Fail-operational Flight
  Set 2A/Max continuous power
  Subset 2B/Extended, maximum non-continuous power
FIG. 8C—Two Motors-out, Fail-Critical
  Set 3A/Two motors-out (EO)—maximum continuous power
  Subset 3B/Two motors-out (EO)—extended, maximum non-continuous power
FIG. 8D—Power supply and battery failure modes
  Set 4A/L>80% Weight-nominal power
  Subset 4B/L<80% Weight-reduced power
  Subset 4C/L=0, no power, recovery device deployments, parachute and/or airbags FIG. 9 illustrates another embodiment of an aircraft 400 which incorporates the present subject matter. The aircraft 400, like the aircraft 1, includes redundant components for enabling fail-operational functioning, but includes two motors which drive one propeller per side of the aircraft. Thus, the aircraft 440 includes a starboard propeller system 405 on the starboard side of the fuselage 420 and a port propeller system 410 on the port side of the fuselage. In this embodiment, the power control circuit of FIG. 6 may be employed to use either one or two motors to rotate one propeller, 450 and 484.

The pitch-pivot function for the twin fans can be inboard (gyrocopter) or outboard, similar to pivoting propulsion units of V-22/Osprey (not shown). In the latter case, the pivot function may be non-uniform, enabling additional and increased yaw and roll rate, commanded maneuvers.

The starboard propeller system 405 and port propeller system 410 are each mounted to the fuselage 420 by a boom assembly 424 (also called a support beam 424). The boom assembly 424 may comprise a first boom extending outward of the starboard side of the fuselage 424 and a second boom extending outward of the port side of the fuselage 424. In the illustrated embodiment, the boom assembly 424 comprises a first boom and a second boom connected to the first boom, in which the first boom and second boom may be an integral, unitary element or two separate booms connected to each other. Alternatively, in another embodiment, the first boom and second boom may be separate components that are not directly connected to each other.

The boom assembly 424 is rotatable about axis 430 constrained by concentric fittings 428 and 434, and supports the propeller systems 405 and 410, such that the pitch of both the first propeller system 405 and second propeller system 410 can be adjusted by rotating or pivoting the boom assembly 424. Each of the propeller systems 405 and 410 comprises two motors driving a single fan as shown in FIG. 6. Support beams 426 and 432 mount the boom assembly 424 to the fuselage 420. In one of many possible alternatives each propeller system 405 and 410 may rotate independently provided by the addition of servo motors and gears to respond to signals from a control circuit that command relative pitch for providing yaw and rolling, air vehicle control torques.

Redundancy in this construction has significant advantages over current multi-prop vehicles for transporting person(s). Many unmanned drones and manned air-taxis comprise at least four, six, eight or more motor-propulsion assemblies. These configurations are neither fail-safe nor fail-operational in view of their fan locations and quantities. They do not possess well-engineered, redundant subsystems, they attempt to combat failures with a multiplicity of propulsion units.

The redundancy and reliability provisions for near-human operation and human occupancy requires a fully integrated design that provides fail-operational utility. The novelty of the presented embodiments, FIGS. 1, 4, 9 and 10, is that four propulsion units can be successfully integrated for maximum reliability, and assert that four motor propulsion units, with pairs positioned within a 10% propeller diameter envelope, is the ideal and fully optimal quantity. Epsilon Control enables this arrangement by minimizing upsets due to subcomponent failures.

FIG. 10 is a side view of a twin fan aircraft 800 which utilizes a sway bar 834 and rudder 830 to create necessary control offsets between the center of gravity, propulsion units and the centers of lift. A fuselage 806 has a sway bar 834 transversely mounted to support a first propulsion unit 802 and a second propulsion unit 804. A rudder 830 is used to create a force vector 832 in the transverse direction. The first and second propulsion units 802 and 804 are controlled to rotate with respect to the sway bar 808. In this manner, forces directing forward movement of the fuselage 806 can be varied.

Figures 10A, 10B:
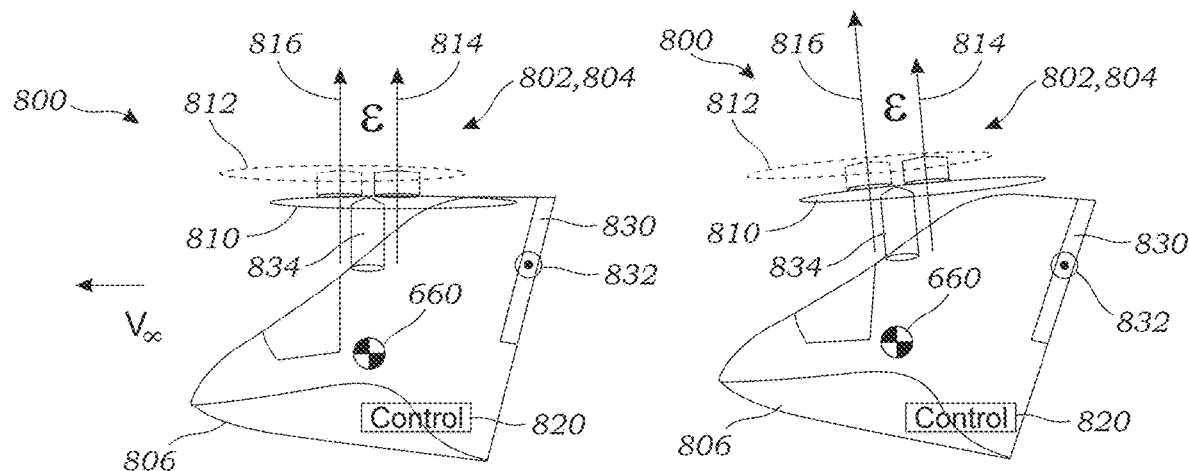
FIGS. 10A and 10B are diagrams of forces and directions in which the forces are applied to effect enhanced pitch control augmentation, gust alleviation and precision pointing in the aircraft embodiment disclosed herein, and utilizing a control system which employs the principles of the epsilon control feedback shown in FIG. 12.

FIGS. 10A and 10B employ a parameter called Epsilon in the present description. The fixed moment arm, epsilon, normal distance between 814 and 816 vectors, rotates about a body center mass 660. Applying forces at a radial distance from the body center mass 660 maintains desired pitch. Electronic control of Epsilon Torque enables rapid response due to changes in lift and pitch resulting from motor failure, wind gusts and miscellaneous upsets.

Various embodiments of the aircraft will operate under nominal flight conditions. In nominal flight mode, the motors are operated at about 55% of capacity. The remaining 45% of capacity is reserved for continuing operation of motors when a motor fails. Effective pitch of the propellers is maintained nominally at 14°-16°. Direction of motion is represented by the vector Vinf. Lift and thrust are a functions of propeller blade Beta and RPM.

The present subject matter provides many advantages. Use of the Epsilon Control provides for use of relative pitch control of the rotors to achieve precision pointing. Body free-stream alignment is independent of rotor plane angle of attack. Payloads requiring precision in positioning, such as cameras or armaments, can be controlled within tight constraints. Structure providing for the Epsilon Control enables Harrier-like operations, VTOL fighter movement, and close air support.

Typical quads have their rotors in planar arrangements. However, the present embodiments employ angular momentum mixing and enhance multi-propeller capabilities. The twin fan concept may require a moderate amount of dihedral for flight stability, which can also be used to mix and create novel control modes. Also, propeller axis separation for precision pointing enables several potential geometries in propeller arrangement, each of which afford a unique angular momentum mixing opportunities.

FIGS. 10A and 10B are diagrams of the aircraft 800 utilizing a control system which employs the principles of the Epsilon Control for pitch augmentation and precision pointing. FIG. 10A represents an aircraft 800 trimmed to stay on a particular course. This system will respond to transient effects, such as large gusts in order to stabilize pitch. FIG. 10B represents an aircraft 800 controlled for precision pointing of pitch. FIGS. 10A and 10B represent both port and starboard propulsion units 802 and 804. A lower fan 810 is vertically displaced from an upper fan 812. The lower fan 810 rotates on an axis 814 and the upper fan 812 rotates on an axis 816. A control system 820 is housed in a fuselage 826 and responds to perturbations in the forces applied to the fans. The control system 820 is designed with low latency. The control system 820 operates servomotors which determine the relative angular position of the lower fan 810 and the upper fan 816. In the embodiment of FIGS. 10A and 10B, the mechanical construction omits the swept booms as used in the embodiment of FIG. 3. In the embodiment of FIG. 10B, the objective is to change the pitch of the drone 800 rather than to maintain substantially constant pitch as in the illustration in FIG. 10A. In this case, the relative power loadings of the lower fan 810 and the upper fan 812 are deliberately unbalanced so that a torque is applied to change the pitch and point the aircraft in a commanded direction. The boom 830 pitch is altered to balance the overall moments to obtain zero effective pitch relative to the free-stream velocity. In this manner, Epsilon Control is used to maintain stability of pitch when desired, and to command pitch orientation by precision pointing when desired.

Figure 11:
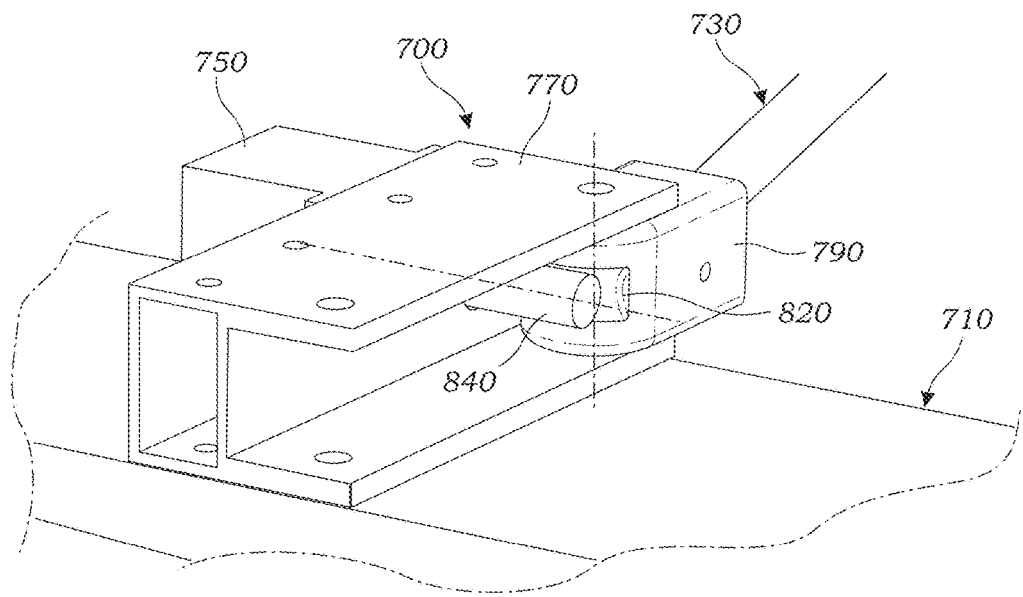
FIG. 11 is a diagram of a twin fan, sweep mechanism.

FIG. 11 displays one of many possible boom attachment, control and structurally connective assemblies for the presented embodiments. For clarity, only one side of the assembly is shown. The boom attach and center-section, carry-thru structure includes servo actuation details that provide for minimal-backlash and/or hysteresis which allows for smoothly coordinated flight. A boom 730 is inserted into fitting 790 to allow for quick connect and disconnect of one twin fan boom subassembly, e.g. comprised of 20 and 26.

This fitting 790 is threaded 820 which conforms to the servo 750 output shaft 840 that commands boom sweep location, gamma, $\Lambda_B$. The surrounding structure 770 isolates the powerful lift and torque loads from the servo control mechanism, while transferring flight loads to the appropriate drone primary structure 710.

A majority of a subsystem's structure may be sufficiently stiffened, yet a single element's flexibility will defeat these best efforts at design throughout the assembly. The boom attachment assembly must provide for free movement of the twin fan booms to accommodate rapid, potential changes in cg location or drone-state upset.

Figure 12:
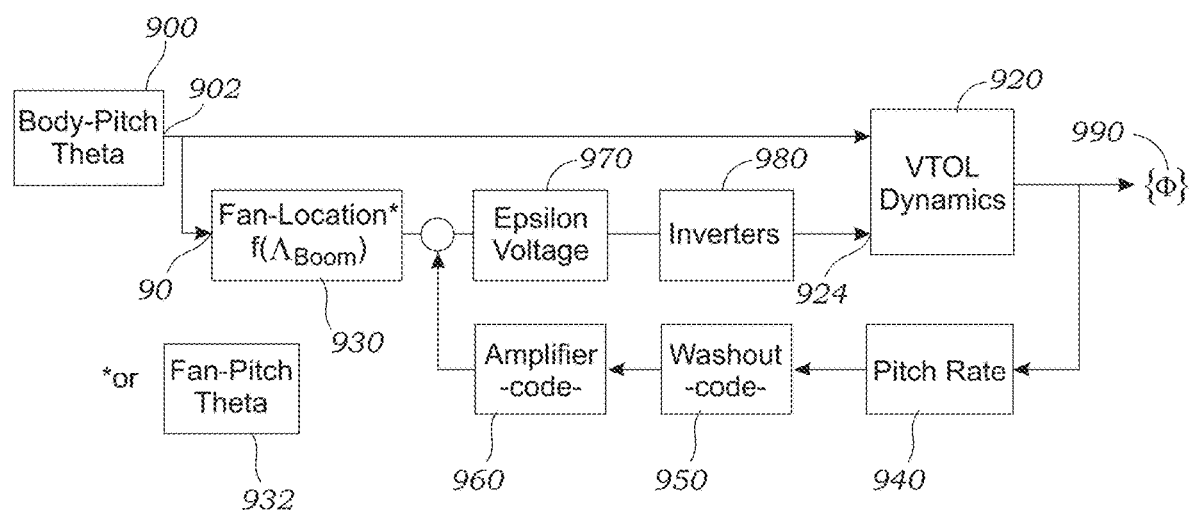
FIG. 12 is a diagram of the Epsilon Control, flight control augmentation system, that monitors and commands boom sweep (or tilt) for fail-operational transition, gust alleviation and precision pointing.

FIG. 12 is a block diagram of the control circuit 120 referred to with respect to FIG. 3. An angle of attack sensor 900 measures body pitch $\ominus$ of the aircraft 800. A state vector 990 is provided at the output of a VTOL dynamics module 920. Inputs to the VTOL dynamics module 920 include $\ominus$ at a terminal 922 and a function of $\ominus$ at a terminal 924. The terminal 902 supplies the value $\ominus$ to a fan pitch module 930 (or 932) to a mixer 936. The state vector 990 is provided to a pitch rate module 940 which uses a gyroscope to measure pitch rate. The output of the pitch rate module is coupled by a washout code module 950 to an amplifier 960 that provides a second input to the mixer 936. The washout code module 950 comprises a pitch damper, and the amplifier 960 provides a scaling factor. Output of the mixer 936 provides an input to an Epsilon voltage module 970 to provide a signal indicative of a desired adjustment to the state vector. The output of the Epsilon voltage module 970 is translated by inverters 980 to provide an AC signal to the second input terminal 924 of the VTOL dynamics module 920. In this manner the commanded pitch can be maintained in response to transient conditions, such as gusts.

The majority of small drones utilize PID controllers and do not include many of the advanced features or capabilities of their larger aerospace-industrial cousins. The twin fan aircraft with Epsilon Control (EC) disclosed herein allows for independent pointing of the fuselage and smoothing of payload motions. The Twin Fan control system will include additional features to reduce overall dynamic energy with specific tuning of desired damping ratios.

Figure 13:
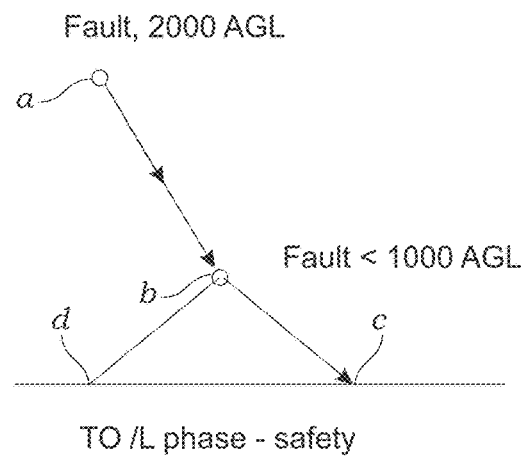
FIG. 13 is a diagram illustrating a sequence of operations in response to an emergency condition.

FIG. 13 is a diagram illustrating a sequence of operations in response to each of two different emergency conditions. The aircraft must operate in a fail-safe or fail-operational mode. In order to do this, the aircraft must travel a sufficient horizontal distance so that it is capable of making a safe landing. In a first emergency situation, an aircraft at point "a" experiences a motor failure. As an example, a motor failure at 2000 feet above ground level (AGL) occurs. Above Ground Level describes the literal height above the ground over which the aircraft is flying. Aircraft use altimeters adjusted for local air pressure, which measure AGL, flying at relatively low heights, such as during landing, laser altimeters may also be incorporated into the sensor suite. In the first emergency situation, the aircraft will invoke an emergency procedure such as disabling a motor, paired with a failed motor, and continuing with remaining motors operating at a higher percentage of capacity. The aircraft reaches point "b" which may be at 1000 AGL and then enters the landing phase. The aircraft performs landing procedures to land safely at point "c." In the second emergency situation, an aircraft takes off at point "d." It continues to fly in its normal mode but experiences a failure at point "b." The drone (aircraft) will use its redundant resources during a landing mode to arrive at point "c."

Figure 14:
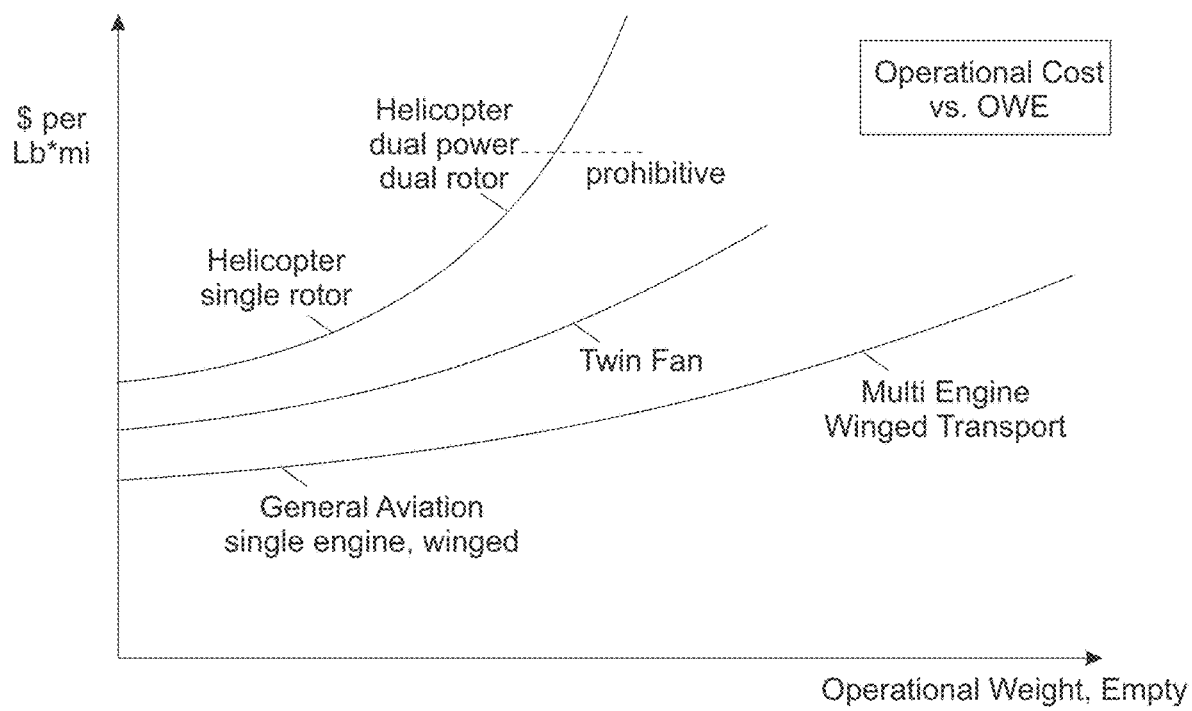
FIG. 14 is a diagram illustrating operational cost benefits of the twin fan propulsion configurations for the aircraft embodiments disclosed herein.

FIG. 14 notionally presents the comparative benefits of a Twin Fan drone or vehicle in terms of operational cost. While the figure is notional, prior basic studies evaluating VTOL-UAVs highlighted the trends between aircraft and helicopters. By adding redundancy and reducing mechanical complexity, a Twin Fan system should possess reduced life-cycle cost thereby justifying development across a wide range of payload capacities.

The twin-fan design provides for increased safety thru increased redundancy at a moderate expense of a higher operating weight empty (OWE) relative to current quadcopter designs. However, the less obvious comparisons to helicopters, which include blade control swashplate, adding weight and parts count which increases operational cost, as a helicopter's operating costs has been shown to increase quadratically with increasing takeoff weight, as shown in FIG. 14.

Relative to multi-prop drones and autonomous air-taxis, the twin fan embodiment that is essential for "fail-operational" flight, also coincides with potentially lower operational costs supporting substantially higher payloads as compared to the equivalent helicopter.

The present subject matter may be embodied in many different forms. The present specification contains teachings to enable a wide range of constructions which will utilize the fail-operational features and the Epsilon Control in combination with several pitch trim methods. This specification will enable those skilled in the art to provide many different constructions, each in accordance with the present subject matter. The foregoing detailed description of the apparatus of the present invention has been described with reference to specific embodiments thereof. It will be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

What is claimed is:

1. An aircraft, comprising:

a fuselage having a front, a rear, a left side and a right side, wherein a longitudinal axis extends from the rear to the front of the fuselage;

a first propulsion unit mounted to the fuselage by a first boom extending outward from the right side of the fuselage, a first end of the first boom pivotally coupled to the fuselage such that a sweep angle of the first boom relative to the longitudinal axis is adjustable, the first propulsion unit mounted to the first boom, the first propulsion unit comprising a first upper motor-propeller assembly including a first upper propeller rotatable about a first upper axis and a first upper motor coupled to the first upper propeller to drive the first upper propeller, a first lower motor-propeller assembly including a first lower propeller rotatable about a first lower axis and a first lower motor coupled to the first lower propeller to drive the first lower propeller, the first lower axis substantially parallel to the first upper axis such that the first upper propeller and first lower propeller are substantially parallel and the first lower propeller is vertically displaced below, and overlapping, the first upper propeller;

a second propulsion unit mounted to the fuselage by a second boom extending outward from the left side of the fuselage, a first end of the second boom pivotally coupled to the fuselage such that a sweep angle of the second boom relative to the longitudinal axis is adjustable, the second propulsion unit mounted to the second boom, the second propulsion unit comprising a second upper motor-propeller assembly including a second upper propeller rotatable about a second upper axis, a second upper motor coupled to the second upper propeller to drive the second upper propeller, a second lower motor-propeller assembly including a second lower propeller rotatable about a second lower axis and a second lower motor coupled to the second lower propeller to drive the second lower propeller, the second lower axis substantially parallel to the second upper axis such that the second upper propeller and second lower propeller are substantially parallel and the first lower propeller is vertically displaced below, and overlapping, the first upper propeller, a first driver coupled to the first upper motor and one of the second upper motor and the second lower motor and a second driver coupled to the first lower motor and the other of the second upper motor and the second lower motor, the first driver and second driver independent from each other such that the first driver is capable of powering its respective coupled motors independently of the second driver driving its respective coupled motors and the second driver is capable of driving its respective coupled motors independently of the first driver driving its respective coupled motors; and a controller operably coupled to the first driver and the second driver, wherein the controller is configured to provide a fail-operational function in an event of failure of one of the first upper motor, first lower motor, second upper motor, second lower motor, first upper propeller, first lower propeller, second upper propeller and second lower propeller in one of the propulsion units (referred to as "the failed motor-propeller assembly") by disabling the failed motor-propeller assembly and disabling the corresponding motor-propeller assembly coupled to the same driver as the failed motor-propeller assembly and using the other driver to power the two remaining motor-propeller assemblies coupled to the other driver.

2. The aircraft of claim 1, wherein:

the first upper axis is coaxial with the first lower axis; and
the second upper axis is coaxial with the second lower axis.

3. The aircraft of claim 1, wherein:

the first upper axis is offset by a first Epsilon distance from the first lower axis in a direction substantially parallel to the longitudinal axis, wherein the first Epsilon distance is greater than zero and less than the lesser of: (a) 10% of a diameter of the first upper propeller, and (b) 10% of a diameter of the first lower propeller; and the second upper axis is offset by a second Epsilon distance from the second lower axis in a direction substantially parallel to the longitudinal axis, wherein the second Epsilon distance is greater than zero and less than the lesser of: (a) 10% of a diameter of the second upper propeller, and (b) 10% of a diameter of the second lower propeller.

4. The aircraft of claim 3, wherein the aircraft is configured to use Epsilon Control to control a pitch of the aircraft.

5. The aircraft of claim 1, wherein the first propulsion unit and second propulsion unit are configured to enable vertical takeoff and landing of the aircraft.

6. The aircraft of claim 1, wherein the aircraft is configured as an autonomous drone.

7. The aircraft of claim 1, wherein the aircraft is configured as an onboard piloted aircraft and the aircraft is configured to carry one or more passengers.

8. The aircraft of claim 1, further comprising:

a redundant power system for powering the first upper motor, first lower motor, second upper motor and second lower motor, the power system comprising a first generator motor coupled to a first generator for powering the first generator to produce electric power, the first generator operably coupled to the first driver and a first battery to provide electric power to the first driver and first battery;

a second generator coupled to a second generator for powering the second generator to produce electric power, the second generator operably coupled to the second driver and a second battery; and wherein the controller is configured to provide a fail-operational function operation in an event of failure of one of the first generator and second generator by disabling or disconnecting the failed generator a power circuit, and connecting the first battery and second battery to the first driver or second driver which is connected to the failed generator to thereby power such driver and in turn power the respective propeller motors which are connected to such driver.

9. The aircraft of claim 8, wherein:

the first upper axis is offset by a first Epsilon distance from the first lower axis in a direction parallel to the longitudinal axis, wherein the first Epsilon distance is greater than zero and less than the lesser of: (a) 10% of a diameter of the first upper propeller, and (b) 10% of a diameter of the first lower propeller; and the second upper axis is offset by a second Epsilon distance from the second lower axis in a direction parallel to the longitudinal axis, wherein the second Epsilon distance is greater than zero and less than the lesser of: (a) 10% of a diameter of the second upper propeller, and (b) 10% of a diameter of the second lower propeller.

10. The aircraft of claim 1, further comprising:
a power system for powering the first upper motor, first lower motor, second upper motor and second lower motor, the power system comprising a plurality of batteries each having different capacities which can be combined into a battery stack to provide a plurality of different combined capacities for the battery stack.

11. An aircraft, comprising:
a fuselage having a front, a rear, a left side and a right side, wherein a longitudinal axis extends from the rear to the front of the fuselage;
a boom assembly coupled to the fuselage, the boom assembly comprising a first boom extending outward of the right side of the fuselage and a second boom extending outward of the fuselage on left side of the fuselage;
a first propeller system mounted to the first boom on the right side of the fuselage, the first propeller system comprising a first propeller, a first upper motor coupled to the first propeller to drive the first propeller, and a first lower motor coupled to the first propeller to drive the first propeller;
a second propeller system mounted to the second boom on the left side of the fuselage, the second propeller system comprising a second propeller, a second upper motor coupled to the second propeller to drive the second propeller, and a second lower motor coupled to the first propeller to drive the second propeller;
a first driver coupled to the first upper motor and one of the second upper motor and the second lower motor and a second driver coupled to the first lower motor and the other of the second upper motor and the second lower motor, the first driver and second driver independent from each other such that the first driver is capable of driving its respective coupled motors independently of the second driver driving its respective coupled motors and the second driver is capable of driving its respective coupled motors independently of the first driver driving its respective coupled motors; and
a controller operably coupled to the first driver and the second driver, wherein the controller is configured to provide a fail-operational function in an event of failure of one of the motors by disabling the failed motor and disabling the corresponding motor coupled to the same driver as the failed motor and using the other driver to power the two remaining motors coupled to the other driver.

12. The aircraft of claim 11, wherein the boom assembly comprises the first boom and the second boom connected to each other as one of an integral unit, or two separate booms connected to each other.

13. The aircraft of claim 11, wherein the boom assembly is pivotally coupled to the fuselage such that the boom assembly can be pivoted to adjust a pitch of the first propeller system and second propeller system.

14. The aircraft of claim 13, wherein the first boom and second boom can be pivoted independently of each other.

15. The aircraft of claim 13, wherein the first boom and second boom are connected to each other and the boom assembly is pivoted to adjust the pitch of the first propeller system and second propeller system concurrently.

16. The aircraft of claim 13, wherein:
the first propeller system is rotatably coupled to the boom assembly such that the first propeller system can be rotated to adjust the pitch of the first propeller system; and
the second propeller system is rotatably coupled to the boom assembly such that the second propeller system can be rotated to adjust the pitch of the second propeller system.

17. The aircraft of claim 11, wherein the first propeller system and second propeller system are configured to enable vertical takeoff and landing of the aircraft.

18. The aircraft of claim 11, wherein the aircraft is configured as an autonomous drone.

19. The aircraft of claim 11, wherein the aircraft is configured as an onboard piloted aircraft and the aircraft is configured to carry one or more passengers.

20. The aircraft of claim 11, further comprising:
a redundant power system for powering the first upper motor, first lower motor, second upper motor and second lower motor, the power system comprising
a first generator motor coupled to a first generator for powering the first generator to produce electric power, the first generator operably coupled to the first driver and a first battery to provide electric power to the first driver and first battery;
a second generator coupled to a second generator for powering the second generator to produce electric power, the second generator operably coupled to the second driver and a second battery; and
wherein the controller is configured to provide a fail-operational function in an event of failure of one of the first generator and second generator by disabling or disconnecting the failed generator a power circuit, and connecting the first battery and second battery to the first driver or second driver which is connected to the failed generator to thereby power such driver and in turn power the respective propeller motors which are connected to such driver.

21. The aircraft of claim 11, further comprising:
a power system for powering the first upper motor, first lower motor, second upper motor and second lower motor, the power system comprising a plurality of batteries each having different capacities which can be combined into a battery stack to provide a plurality of different combined capacities for the battery stack.

* * * * *